(12) United States Patent
Cypher et al.

(10) Patent No.: US 6,970,980 B2
(45) Date of Patent: *Nov. 29, 2005

(54) SYSTEM WITH MULTICAST INVALIDATIONS AND SPLIT OWNERSHIP AND ACCESS RIGHT COHERENCE MECHANISM

(75) Inventors: Robert E. Cypher, Saratoga, CA (US); Andrew Phelps, Encinitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 10/184,175

(22) Filed: Jun. 28, 2002

(65) Prior Publication Data

US 2004/0003183 A1   Jan. 1, 2004

(51) Int. Cl.$^7$ .............................................. G06F 12/00
(52) U.S. Cl. ..................... 711/141; 709/231; 709/230; 709/232; 711/144; 711/145; 711/156; 711/163
(58) Field of Search ....................... 711/141, 144, 145, 711/156, 163; 709/230, 231, 232

(56) References Cited

U.S. PATENT DOCUMENTS

| | | | |
|---|---|---|---|
| 5,761,721 A | | 6/1998 | Baldus et al. |
| 5,802,582 A | | 9/1998 | Ekanadham et al. |
| 5,875,462 A | * | 2/1999 | Bauman et al. ............. 711/119 |
| 5,978,874 A | | 11/1999 | Singhal et al. |
| 6,088,768 A | | 7/2000 | Baldus et al. |
| 6,154,816 A | * | 11/2000 | Steely et al. ................ 711/150 |
| 6,209,064 B1 | | 3/2001 | Weber |
| 6,279,084 B1 | * | 8/2001 | VanDoren et al. .......... 711/141 |
| 6,484,240 B1 | | 11/2002 | Cypher et al. |
| 2004/0003180 A1 | | 1/2004 | Cypher |
| 2004/0003181 A1 | | 1/2004 | Cypher |
| 2004/0003182 A1 | | 1/2004 | Cypher |

OTHER PUBLICATIONS

"Specifying and Verifying a Broadcast and a Multicast Snooping Cache Coherence Protocol", Sorin, et al, *IEEE Transactions on Parallel and Distributed Systems*, vol. 13, No. 6, Jun. 2002, http://www.cs.wise.edu/multifacet/papers/tpds02_lamport.pdf.

"Multicast Snooping: A New Coherence Method Using a Mulicast Address Network", Bilir, et al, *The 26$^{th}$ International Symposium on Computer Architecture*, IEEE, Atlanta, GA, May 2-4, 1999, http://csdl.computer.org/comp/proceedings/isca/1999/0170/00/01700294abs.htm.

"Architecture and Design of AlphaServer GS320", Gharachorloo, et al, *ACM Sigplan Notices*, vol. 35, Isseu 11, Nov. 2000, http://portal.acm.org/citation.cfm?id=356991&dl=ACM&coll=portal.

"View Caching: Efficient Software Shared Memory for Dynamic Computations", Karamcheti, et al, *11$^{th}$ International Parallel Processing Symposium*, Geneva, Switzerland, Apr. 1-5, 1997, http://ipdps.eece.unm.edu/1997/s13/318.pdf.

(Continued)

*Primary Examiner*—Mano Padmanabhan
*Assistant Examiner*—Mehdi Namazi
(74) *Attorney, Agent, or Firm*—Meyertons Hood Kivlin Kowert & Goetzel, P.C.; B. Noël Kivlin

(57) ABSTRACT

Various systems and methods for using a directory based coherency protocol in a system that employs a split ownership and access right cache coherence mechanism are disclosed. A computer system may include a directory, several active devices configured to access data stored, an address network configured to convey coherence requests point-to-point between the active devices and the directory, and a data network configured to convey data between the active devices. If at least one of a subset of the active devices has a shared access right to a requested coherency unit, the directory is configured to send an invalidating address packet to each of the active devices in the subset. The subset contains fewer than all of the active devices.

21 Claims, 24 Drawing Sheets

OTHER PUBLICATIONS

"Cache-Coherent Distributed Shared Memory: Perspectives on Its Development and Future Challenges", Hennessy, et al, *Proceedings of the IEEE*, vol. 87, Issue 3, Mar. 1999, ISSN 0018-9219, http://cva.stanford.edu/cs99s/papers/hennessy-cc.pdf.

"Survey on Cache Coherence in Shared & Distributed Memory Multiprocessors", Garg, et al, Online, http://www.cse.psu.edu/~cg530/proj03/cache$_{13}$coherence.pdf.

"A Survey of Cache Coherence Mechanisms in Shared Memory Multiprocessors", Lawrence, Department of Computer Science, University of Manitoba, Manitoba, Canada, May 14, 1998, http://www.cs.uiowa.edu/~rlawrenc/research/Papers/cc.pdf.

"Bandwidth Adaptive Snooping", Martin, et al. *8th Annual International Symposium on High-Performance Computer Architecture (HPCA-8)*, Cambridge, MA, Feb. 2-6, 2002.

"Timestamp Snooping: An Approach for Extending SMPs", Martin, et al., *9th International Conference on Architectural Support for Programming Languages and Operating Systems (ASPLOS-IX)*, Cambridge, MA, Nov. 13-15, 2000.

"Isotach Networks", Reynolds, et al., IEEE Transactions on Parallel and Distributed Systems, vol. 8, No. 4, Apr. 1997.

* cited by examiner

|  | Address 502 | Home 504 | Mode 506 |
|---|---|---|---|
| 510A | A | Client 3 | PTP |
| 510B | B | Client 3 | BC |
| 510C | C | Client 1 | PTP |
| 510D | D | Client 4 | PTP |
| 510E | E | Client 3 | BC |
| 510F | F | Client 2 | BC |
| 510G | G | Client 5 | PTP |
| | ⋮ | ⋮ | ⋮ |

*Fig. 3*

| Address 602 | Client 1 604 | Client 2 606 | Client 3 608 | Client 4 610 | Client 5 612 | Owner 614 |
|---|---|---|---|---|---|---|
| Aa | — | — | M | — | — | Client 3 |
| Ab | — | — | M | — | — | Client 3 |
| Ac | — | — | M | — | — | Client 3 |
| Ad | M | — | S | S | — | Client 1 |
| Ae | S | — | S | S | — | None |
| Af | S | — | O | — | — | Client 3 |
| Ag | — | — | — | M | — | Client 4 |
| ... | ... | ... | ... | ... | ... | ... |

Fig. 4

| Address 602 | Client 1 604 | Client 2 606 | Client 3 608 | Client 4 610 | Client 5 612 | Owner 614 |
|---|---|---|---|---|---|---|
| Aa | — | — | W | — | — | Client 3 |
| Ab | — | — | W | — | — | Client 3 |
| Ac | — | — | W | — | — | Client 3 |
| Ad | R | — | R | R | — | Client 1 |
| Ae | R | — | R | R | — | None |
| Af | R | — | R | — | — | Client 3 |
| Ag | — | — | — | W | — | Client 4 |
| ... | ... | ... | ... | ... | ... | ... |

Fig. 4A

| Packet Type | Full Name | Address Space | | Description |
|---|---|---|---|---|
| | | Cacheable | I/O | |
| RTS | ReadToShare | Y | | Requests read-only copy of cache line |
| RTO | ReadToOwn | Y | | Requests writable copy of cache line |
| RTWB | ReadToWriteBack | Y | | Requests to receive writable copy of cache line and send cache line to memory |
| RS | ReadStream | Y | | Request read-once copy of cache line |
| WS | WriteStream | Y | | Request to write entire cache line and send to memory |
| WB | WriteBack | Y | | Request to send cache line from owning device to memory, device does not keep copy |
| WBS | WriteBackShared | Y | | Request to send cache line from owning device to memory, device keeps read-only copy |
| RIO | ReadIO | | Y | Request to read IO locations |
| WIO | WriteIO | | Y | Request to write IO locations |
| INT | Interrupt | | | Sends an interrupt, target is specified by address |

Fig. 7

| Transaction Type | Initiator Receives | Initiator Sends |
|---|---|---|
| RTS | DATA | |
| RTO | DATA | |
| RTWB | DATA & PRN | DATA |
| RS | DATA | |
| WS | ACK & PRN | DATA |
| WB | PRN | DATA or NACK |
| WBS | PRN | DATA or NACK |

Fig. 8

| Transaction Type | Initiator Receives | Initiator Sends |
|---|---|---|
| RIO | DATA | |
| WIO | PRN | DATA |
| INT | PRN or NACK | DATA or Nothing |

*Fig. 9*

| Access Rights Symbol | Access Rights Name | Description | Data Present? |
|---|---|---|---|
| W | Write | Read and Write | Yes (or ACK) |
| A | All-Write | Write-only, must write entire cache line | Yes |
| R | Read | Read-only | Yes |
| T | Transient-Read | Read-only, read can be reordered | Yes |
| I | Invalid | No access rights | Yes or No |

*Fig. 10A*

| Ownership Status Symbol | Ownership Status Name | Description | Data Present? |
|---|---|---|---|
| O | Owner | Owns cache line | Yes or No |
| N | Not Owner | Does not own cache line | Yes or No |

*Fig. 10B*

| Access Right | Ownership Status |
|---|---|
| W | O |
| R | O |
| I | O |
| W | N |
| A | N |
| R | N |
| T | N |
| I | N |

*Fig. 10C*

| Transaction Type | New Owner |
|---|---|
| RTS | Previous Owner |
| RTO | Initiator |
| RTWB | Memory |
| RS | Previous Owner |
| WS | Memory |
| WB | Memory (or Previous Owner) |
| WBS | Memory (or Previous Owner) |
Fig. 11
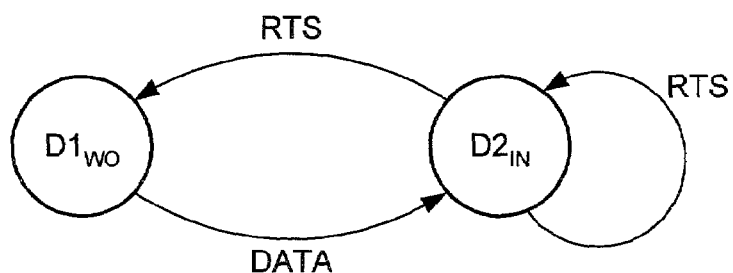
Fig. 12A
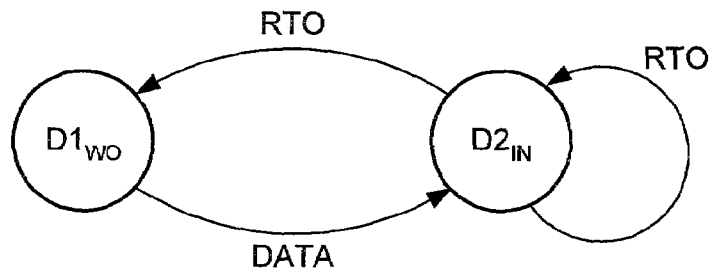
Fig. 12B

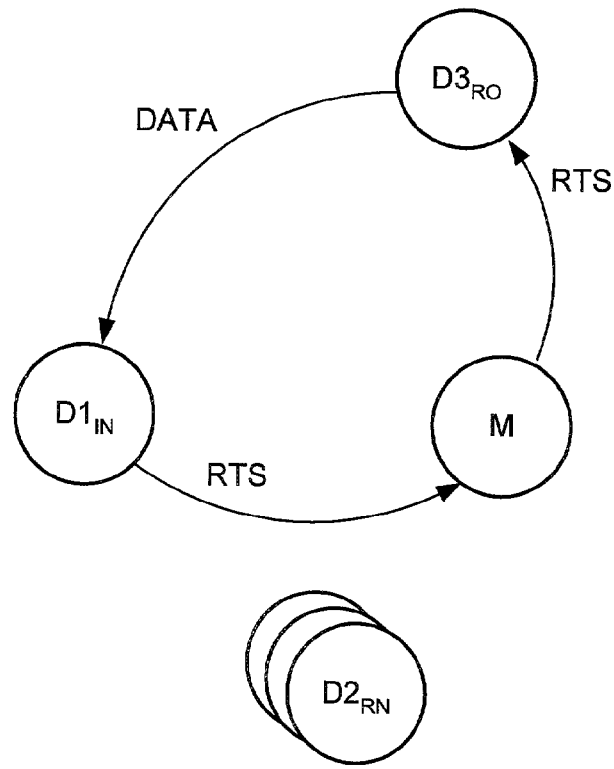
*Fig. 13E*
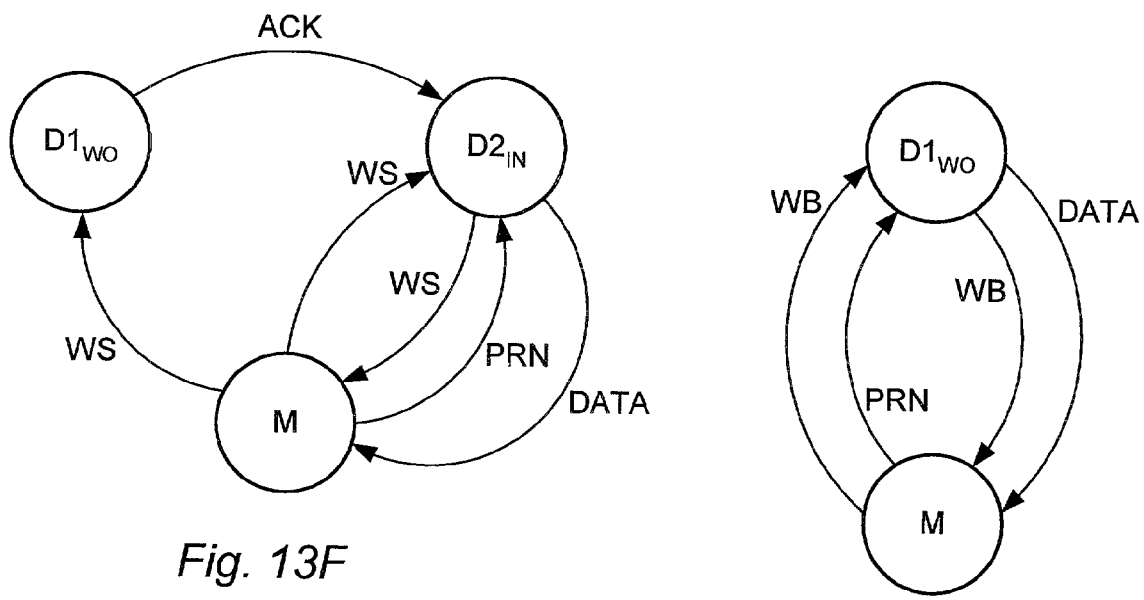
*Fig. 13F*
*Fig. 13G*

| State | Description |
|---|---|
| WOfh | Waiting for WAIT and ACK for local WS, has write access and ownership |
| WO | Stable state with write access and ownership |
| ROfh | Waiting for WAIT and ACK for local WS, has read access and ownership |
| ROe | Waiting for DATA for local RTO, has read access and ownership |
| ROde | Waiting for INV and DATA for local RTO, has read access and ownership |
| ROd | Waiting for INV for local RTO, has read access and ownership |
| ROce | Waiting for WAIT and DATA for local RTO, has read access and ownership |
| RO | Stable state with read access and ownership |
| IOe | Waiting for DATA for local RTO, has read access rights, has ownership |
| IOde | Waiting for INV and DATA for local RTO, has no access rights, has ownership |
| IOd | Waiting for INV for local RTO, has no access rights, has ownership |
| WNj | Able to send DATA/NACK for local WB/WBS, has write access and no ownership |
| WNi | Able to send DATA for local RTWB, write access, no ownership |
| WNh | Waiting for ACK for local WS, has write access, no ownership |
| WNc | Waiting for WAIT for local RTO, has write access, no ownership |
| WN | Stable state with write access, no ownership (caused by foreign transaction that took ownership, but for which no copyback has yet been performed) |
| ANi | Able to send DATA for local WS after performing write to entire cache line, no ownership |
| RNj | Able to send DATA/NACK for local WB/WBS, has read access and no ownership |
| RNh | Waiting for ACK for local WS, has read access, no ownership |
| RNg | Waiting for INV for local WS, has read access, no ownership |
| RNe | Waiting for DATA for local RTO, has read access, no ownership |
| RNde | Waiting for INV and DATA for local RTO, has read access, no ownership |
| RNd | Waiting for INV for local RTO, has read access, no ownership |
| RNce | Waiting for WAIT and DATA for local RTO, has read access, no ownership |
| RNcd | Waiting for WAIT and INV for local RTO, has read access, no ownership |
| RN | Stable state with read access, no ownership |
| TN | Performing read(s), which may be reordered, for local RTS or RS, no ownership |
| INk | Waiting for local RTO, RTWB, WS or WBS after receiving an ERR or ERRL. No access rights, no ownership |
| INj | Able to send DATA/NACK for local WB/WBS, has no access rights and no ownership |
| INh | Waiting for ACK for local WS or for DATA for local RTWB, has no access rights, no ownership |
| INg | Waiting for INV for local WS or for INV for local RTWB, has no access rights, no ownership |
| INe | Waiting for DATA for local RTO, has no access rights, no ownership |
| INde | Waiting for INV and DATA for local RTO, has no access rights, no ownership |
| INd | Waiting for INV for local RTO, has no access rights, no ownership |
| INce | Waiting for WAIT and DATA for local RTO, has no access rights, no ownership |
| INcd | Waiting for WAIT and INV for local RTO, has no access rights, no ownership |
| INa | Waiting for DATA for local RTS, DATA may grant read access, has no access rights, no ownership |
| IN | Stable state with no access rights, no ownership |

*Fig. 15A*

| Action Code | Meaning | Comments |
|---|---|---|
| /a | Commit to send an ACK packet as a copyback by appending an entry for the received foreign packet in a copyback list. Set copy tag to I. | ACK packet may be sent from any state that allows copyback packets to be sent. It must be sent within a finite time of first entering such a state, regardless of what other packets have been received. |
| /c | Commit to send DATA and/or ACK packets for all outstanding copybacks for this cache line. Next, set copy tag to W. Then, perform state transition based on current state & local packet being received. | If sending copybacks changes the state from a state X to a state Y, the local packet being received will be received in state Y (and as a result, the entry for state Y in the table must be consulted to determine the state transition caused by receiving the local packet). |
| /d | Commit to send DATA packet for local RTWB, WS, WB, or WBS transaction. DATA packet is sent in response to receiving a PRN packet for this transaction. | DATA packet may not be sent until a PRN packet is received. It must be sent within finite time of receiving the PRN packet & having entered a state that permits the packet to be sent, regardless of what other packets have been received. |
| /e | Clear outstanding copyback commitments for this line by removing them from the copyback list. Do not send DATA or ACK packets for entries that were on the copyback list. Next, perform state transition based on current state & local packet being received. | This action code is used in response to receiving an ERR or ERRL packet. If an ERR packet was received in place of a PR or PRACK packet, or if an ERRL packet was received in place of a DATAP packet, a DATA packet may be sent to the error device. |
| /i | Commit to send a DATA packet as a copyback by appending an entry for the received foreign packet in the copyback list. Set copy tag to I. | DATA packet may be sent from any state that allows copyback packets to be sent. It must be sent within finite time of first entering such a state, regardless of what other packets have been received. |
| /j | Set write tag to I. | |
| /n | Commit to send NACK packet for local WB or WBS transaction & set write tag to W. NACK packet is sent in response to receiving a PRN packet for this transaction. | NACK packet may be sent at any time after receiving the PRN packet. It must be sent within finite time of receiving the PRN packet, regardless of what other packets have been received. |
| /r | Commit to send a DATA packet as a copyback by appending an entry for the received foreign packet in the copyback list. If copy tag is W, set copy tag to R. | DATA packet may be sent from any state that allows copyback packets to be sent. It must be sent within finite time of first entering such a state, regardless of what other packets have been received. |
| /s | Set write tag to R. | |
| /w | Commit to send a DATA packet as a copyback by appending an entry for the received foreign packet in the copyback list. | DATA packet may be sent from any state that allows copyback packets to be sent. It must be sent within finite time of first entering such a state, regardless of what other packets have been received. |
| /y | If copy tag is R, set copy tag to I. | Used to record invalidating transactions while a copyback for a foreign memory remap is pending. |
| /z | If write tag is R, set write tag to I. | Used to record invalidating transactions while a local WBS transaction is pending. |

| | | WOfh | WO | ROfh | ROe | ROde | ROd | ROce | RO | IOe | IOde | IOd | WNj | WNi | WNh | WNc | WN | ANi |
|---|---|---|---|---|---|---|---|---|---|---|---|---|---|---|---|---|---|---|
| | Silent Downgrade | | | | | | | | RO | | | | | | | | | RN |
| Send DATA or NACK | Write tag I | | | | | | | | | | | | IN | IN | | | | IN |
| | Write tag R | | | | | | | | | | | | | RN | | | | |
| | Write tag W | | | | | | | | | | | | WN | | | | | |
| | ERRL for RTO/RTWB | | | | | | | | | e/IN | | | | | | | | |
| | ERRL for RTS/RS | | | | | | | | | | | | | | | | | |
| | ERR | | | | | | | | | | | | WN | | WN | | | |
| | WB/WBS | | WNi/d | | | | | | | RNi/d | | | | | | | | WNi/n |
| | ACK for WS | | | | | | | | | | | | | | | | | |
| | INV for WS | | WOth | | | | | | | ROth | | | | | | | | WNh |
| | WAIT for WS | c/ANi/d | c/INg | c/ANi/d | | | | | | c/ANi/d | c/INg | | | | | | | |
| | WS | c/ANi/d | c/ANi/d | | | | | | | c/ANi/d | | | | | | | | WNh |
| | DATA for RTWB | | | | | | | | | | | | | | | | | |
| | RTWB/INV for RTWB | | | | | | | | | | | | | | | | | |
| | DATA for RTO | | | | WO | ROd | | | | WO | IOd | | | | | | | |
| | INV for RTO | | | | ROe | WO | | ROce | | IOe | WO | | | | | | | |
| | WAIT for RTO | | | | | c/WO | c/ROd | | | | | | | | WO | | | |
| | RTO | | | | | | | c/WO | c/ROd | | | | | | | | | |
| | DATA for RS | | | | | | | | | | | | | | | | | |
| | DATA for RTS | | | | | | | | | | | | | | | | | |
| Send on Address Network | WBS | /s | | | | | /s | | | | | | | | | | /s | |
| | WS/WB | / | | | | | / | | | | | | | | | | / | |
| | RTWB | | | | | | | | | | | | | | | | | |
| | RTO | | | | | | | | | | | | | | | | | |
| | RS | | | | | | | | | | | | | | | | | |
| | RTS | | | | | | | | | | | | | | | | | |
| | Old State | WOfh | WO | ROfh | ROe | ROde | ROd | ROce | RO | IOe | IOde | IOd | WNj | WNi | WNh | WNc | WN | ANi |

Fig. 15C
(Continued)

| Old State | Receive | | | | | | | Send DATA or ACK copyback packet | | |
|---|---|---|---|---|---|---|---|---|---|---|
| | RS | RTS | RTO/RTWB | WS | INV | MRM | MDM | Copy tag W | Copy tag R | Copy tag I |
| WOfh | /w | /r | WNh/f | WNh/a | | | | | ROfh | |
| WO | /w | /r | WN/f | WN/a | /z | WN/r | WN/i | | RO | |
| ROfh | /w | /r | RNh/f | RNh/a | | | | | | |
| ROe | /w | /r | RNe/f | RNe/a | IOe | RNe/r | RNe/i | | | |
| ROde | /w | /r | RNde/f | RNde/a | IOde | | | | | |
| ROd | /w | /r | RNd/i | RNd/a | | | | | | |
| ROce | /w | /r | RNce/i | RNce/a | | | | | | |
| RO | /w | /r | RN/i | RN/a | /z | RN/r | RN/i | | | |
| IOe | /w | /r | INe/i | INe/a | | INe/r | INe/i | | | |
| IOde | /w | /r | INde/i | INde/a | | | | | | |
| IOd | /w | /r | INd/i | INd/a | | | | | | |
| WNj | | /yz | /yz | /z | | /yz | | RNj | INj | |
| WNi | | | | | | | | | | |
| WNh | | | | | | | | | RNh | INh |
| WNc | | | | | | | | | | |
| WN | | /y | /y | /z | | /y | | RN | IN | |
| ANi | | | | | | | | | | |
| RNj | | INj | INj | INj | | INj | | | | INj |
| RNh | | | | INh | | | | | | INh |
| RNg | | | | | | | | | | |
| RNe | | /y | /y | INe | | /y | | | | |
| RNde | | | | INde | | | | | | |
| RNd | | | | | | | | | | |
| RNce | | | | INce | | | | | | INce |
| RNcd | | | | | | | | | | |
| RN | | IN | IN | IN | | IN | | | | IN |
| TN | | | | | | | | | | |
| INk | | | | | | | | | | |
| INj | | | | | | | | | | |
| INh | | | | | | | | | | |
| INg | | | | | | | | | | |
| INe | | /y | /y | | | /y | | | | |
| INde | | | | | | | | | | |
| INd | | | | | | | | | | |
| INce | | | | | | | | | | |
| INcd | | | | | | | | | | |
| INa | | IN | IN | IN | | IN | | | | |
| IN | | | | | | | | | | |

*Fig. 15D*

SYSTEM WITH MULTICAST INVALIDATIONS AND SPLIT OWNERSHIP AND ACCESS RIGHT COHERENCE MECHANISM

BACKGROUND OF THE INVENTION

1. Field of the Invention

This invention relates to the field of multiprocessor computer systems and, more particularly, to coherency protocols employed within multiprocessor computer systems having shared memory architectures.

2. Description of the Related Art

Multiprocessing computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole.

A popular architecture in commercial multiprocessing computer systems is a shared memory architecture in which multiple processors share a common memory. In shared memory multiprocessing systems, a cache hierarchy is typically implemented between the processors and the shared memory. In order to maintain the shared memory model, in which a particular address stores exactly one data value at any given time, shared memory multiprocessing systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory or from a cache.

Shared memory multiprocessing systems generally employ either a broadcast snooping cache coherency protocol or a directory based cache coherency protocol. In a system employing a snooping broadcast protocol (referred to herein as a "broadcast" protocol), coherence requests are broadcast to all processors (or cache subsystems) and memory through a totally ordered address network. Each processor "snoops" the requests from other processors and responds accordingly by updating its cache tags and/or providing the data to another processor. For example, when a subsystem having a shared copy observes a coherence request for exclusive access to the coherency unit, its copy is typically invalidated. Likewise, when a subsystem that currently owns a coherency unit observes a coherence request for that coherency unit, the owning subsystem typically responds by providing the data to the requestor and invalidating its copy, if necessary. By delivering coherence requests in a total order, correct coherence protocol behavior is maintained since all processors and memories observe requests in the same order.

In a standard broadcast protocol, requests arrive at all devices in the same order, and the access rights of the processors are modified in the order in which requests are received. Data transfers occur between caches and memories using a data network, which may be a point-to-point switched network separate from the address network, a broadcast network separate from the address network, or a logical broadcast network which shares the same hardware with the address network. Typically, changes in ownership of a given coherency unit occur concurrently with changes in access rights to the coherency unit.

Unfortunately, the standard broadcast protocol suffers from a significant performance drawback. In particular, the requirement that access rights of processors change in the order in which snoops are received may limit performance. For example, a processor may have issued requests for coherency units A and B, in that order, and it may receive the data for coherency unit B (or already have it) before receiving the data for coherency unit A. In this case the processor must typically wait until it receives the data for coherency unit A before using the data for coherency unit B, thus increasing latency. The impact associated with this requirement is particularly high in processors that support out-of-order execution, prefetching, multiple cores per-processor, and/or multi-threading, since such processors are likely to be able to use data in the order it is received, even if it differs from the order in which it was requested.

In contrast, systems employing directory-based protocols maintain a directory containing information indicating the existence of cached copies of data. Rather than unconditionally broadcasting coherence requests, a coherence request is typically conveyed through a point-to-point network to the directory and, depending upon the information contained in the directory, subsequent coherence requests are sent to those subsystems that may contain cached copies of the data in order to cause specific coherency actions. For example, the directory may contain information indicating that various subsystems contain shared copies of the data. In response to a coherence request for exclusive access to a coherency unit, invalidation requests may be conveyed to the sharing subsystems. The directory may also contain information indicating subsystems that currently own particular coherency units. Accordingly, subsequent coherence requests may additionally include coherence requests that cause an owning subsystem to convey data to a requesting subsystem. In some directory based coherency protocols, specifically sequenced invalidation and/or acknowledgment messages may be required. Numerous variations of directory based cache coherency protocols are well known.

Typical systems that implement a directory-based protocol may be associated with various drawbacks. For example, such systems may suffer from high latency due to the requirement that requests go first to a directory and then to the relevant processors, and/or from the need to wait for acknowledgment messages. In addition, when a large number of processors must receive the request (such as when a coherency unit transitions from a widely shared state to an exclusive state), all of the processors must typically send ACKs to the same destination, thus causing congestion in the network near the destination of the ACKs and requiring complex logic to handle reception of the ACKs. Finally, the directory itself may add cost and complexity to the system.

In certain situations or configurations, systems employing broadcast protocols may attain higher performance than comparable systems employing directory based protocols since coherence requests may be provided directly to all processors unconditionally without the indirection associated with directory protocols and without the overhead of sequencing invalidation and/or acknowledgment messages. However, since each coherence request must be broadcast to all other processors, the bandwidth associated with the network that interconnects the processors in a system employing a broadcast snooping protocol can quickly become a limiting factor in performance, particularly for systems that employ large numbers of processors or when a large number of coherence requests are transmitted during a short period. In such environments, systems employing directory protocols may attain overall higher performance due to lessened network traffic and the avoidance of network bandwidth bottlenecks.

Thus, while the choice of whether to implement a shared memory multiprocessing system using a broadcast snooping protocol or a directory based protocol may be clear based upon certain assumptions regarding network traffic and bandwidth, these assumptions can often change based upon the utilization of the machine. This is particularly true in scalable systems in which the overall numbers of processors connected to the network can vary significantly depending upon the configuration.

SUMMARY

Various embodiments of systems and methods for using a directory based coherency protocol and multicast invalidations in a system that employs a split ownership and access right cache coherence mechanism are disclosed. In one embodiment, a computer system includes a directory, several active devices configured to access data, an address network configured to convey coherence requests point-to-point between the active devices and the directory, and a data network configured to convey data between the active devices. Each active device includes a cache configured to store data accessed by that active device. Each active device may be configured to transition an ownership responsibility for a coherency unit cached in its first cache upon receipt of a first address packet and to transition an access right to the coherency unit upon receipt of a corresponding data packet. The ownership responsibility for the coherency unit transitions at a different time than the access right to the coherency unit transitions. If the directory indicates that at least one active device in a first subset of the active devices has a shared access right to a first coherency unit, the directory may be configured to send an invalidating address packet on the address network to each active device included in the first subset.

BRIEF DESCRIPTION OF THE DRAWINGS

A better understanding of the present invention can be obtained when the following detailed description is considered in conjunction with the following drawings, in which:

FIG. 3 shows one embodiment of a mode table.

FIG. 4 illustrates one embodiment of a directory.

FIG. 4a illustrates another embodiment of a directory.

FIG. 7 is a chart illustrating various requests that may be supported in one embodiment of a computer system.

FIG. 8 illustrates data packet transfers for cacheable transactions in accordance with one embodiment of a computer system.

FIG. 9 illustrates various data packet transfers for non-cacheable transactions that may be supported in one embodiment of a computer system.

FIGS. 10A and 10B illustrate types of access rights and ownership status that may be implemented in one embodiment of a computer system.

FIG. 10C illustrates combinations of access rights and ownership status that may occur in one embodiment of a computer system.

FIG. 11 is a chart illustrating the effects of various transactions on ownership responsibilities in one embodiment of a computer system.

FIGS. 12A–12F illustrate exemplary coherence operations that may be implemented in broadcast mode in one embodiment of a computer system.

FIGS. 13A–13G illustrate exemplary coherence operations that may be implemented in point-to-point mode in one embodiment of a computer system.

FIGS. 15A–15D illustrate specific cache states that may be implemented in one embodiment.

Figure 1:
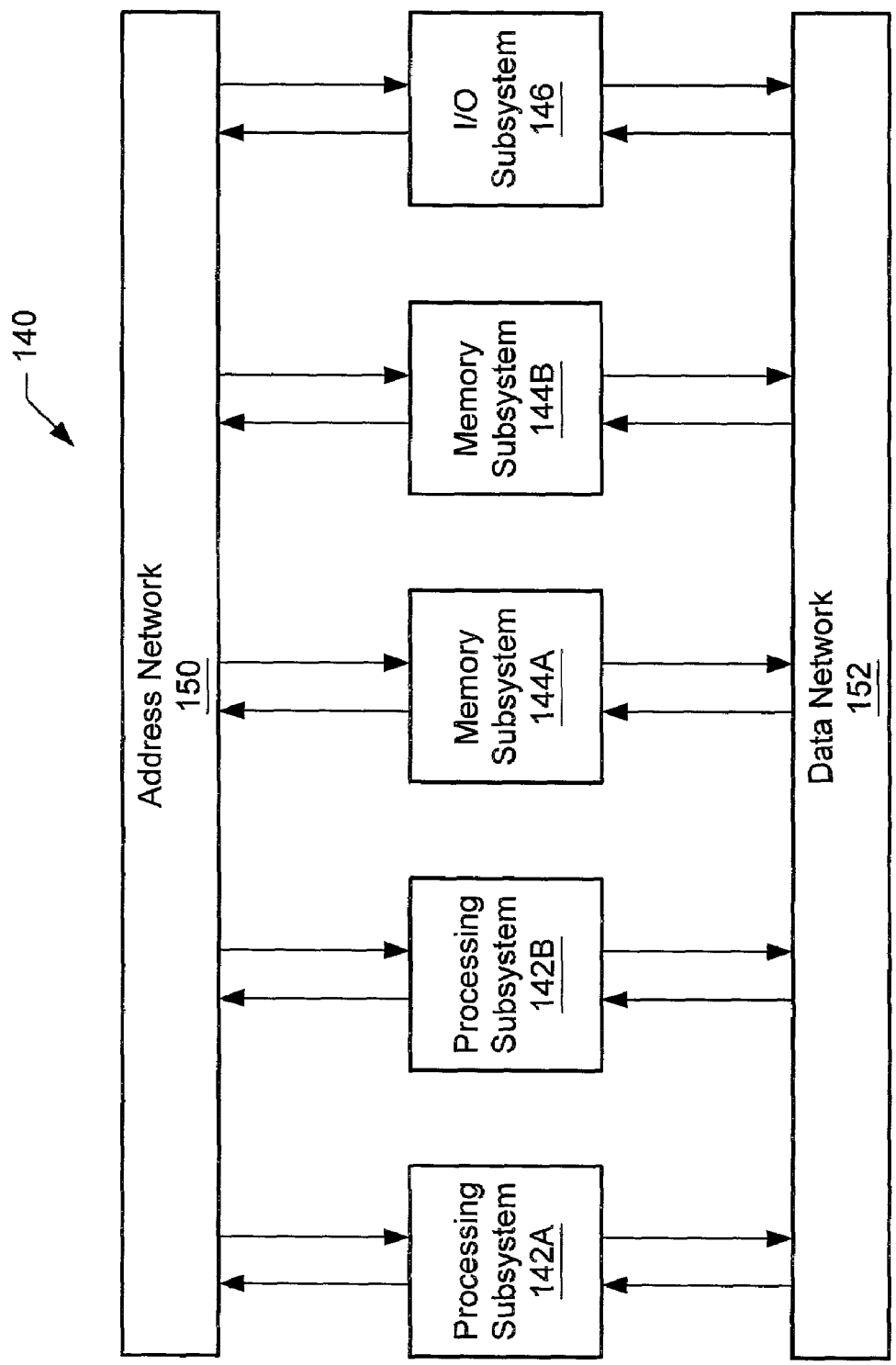
FIG. 1 is a block diagram of one embodiment of a multiprocessing computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System

FIG. 1 shows a block diagram of one embodiment of a computer system 140. Computer system 140 includes processing subsystems 142A and 142B, memory subsystems 144A and 144B, and an I/O subsystem 146 interconnected through an address network 150 and a data network 152. In the embodiment of FIG. 1, each of processing subsystems 142, memory subsystems 144, and I/O subsystem 146 are referred to as a client device. It is noted that although five client devices are shown in FIG. 1, embodiments of computer system 140 employing any number of client devices are contemplated. Elements referred to herein with a particular reference number followed by a letter will be collectively referred to by the reference number alone. For example, processing subsystems 142A–142B will be collectively referred to as processing subsystems 142.

Generally speaking, each of processing subsystems 142 and I/O subsystem 146 may access memory subsystems 144. Devices configured to perform accesses to memory subsystems 144 are referred to herein as "active" devices. Each client in FIG. 1 may be configured to convey address messages on address network 150 and data messages on data network 152 using split-transaction packets. Processing subsystems 142 may include one or more instruction and data caches which may be configured in any of a variety of specific cache arrangements. For example, set-associative or direct-mapped configurations may be employed by the caches within processing subsystems 142. Because each of processing subsystems 142 within computer system 140 may access data in memory subsystems 144, potentially caching the data, coherency must be maintained between processing subsystems 142 and memory subsystems 144, as will be discussed further below.

Memory subsystems 144 are configured to store data and instruction code for use by processing subsystems 142 and I/O subsystem 146. Memory subsystems 144 may include dynamic random access memory (DRAM), although other types of memory may be used in some embodiments. Each address in the address space of computer system 140 may be assigned to a particular memory subsystem 144, referred to herein as the home subsystem of the address. Additionally, each memory subsystem 144 may include a directory suitable for implementing a directory-based coherency protocol. In one embodiment, each directory may be configured to track the states of memory locations assigned to that memory subsystem within computer system 140. Additional details regarding suitable directory implementations are discussed further below.

I/O subsystem 146 is illustrative of a peripheral device such as an input-output bridge, a graphics device, a networking device, etc. In some embodiments, I/O subsystem 146 may include a cache memory subsystem similar to those of processing subsystems 142 for caching data associated with addresses mapped within one of memory subsystems 144.

In one embodiment, data network 152 may be a logical point-to-point network. Data network 152 may be implemented as an electrical bus, a circuit-switched network, or a packet-switched network. In embodiments where data network 152 is a packet-switched network, packets may be sent through the data network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device.

Address network 150 accommodates communication between processing subsystems 142, memory subsystems 144, and I/O subsystem 146. Messages upon address network 150 are generally referred to as address packets. When an address packet references a storage location within a memory subsystem 144, the referenced location may be specified via an address conveyed within the address packet upon address network 150. Subsequently, data corresponding to the address packet on the address network 150 may be conveyed upon data network 152. Typical address packets correspond to requests for an access right (e.g., a readable or writable copy of a cacheable coherency unit) or requests to perform a read or write to a non-cacheable memory location. Address packets may be sent by a device in order to initiate a coherence transaction. Subsequent address packets may be sent to implement the access right and/or ownership changes needed to satisfy the coherence request. In the computer system 140 shown in FIG. 1, a coherence transaction may include one or more packets upon address network 150 and data network 152. Typical coherence transactions involve one or more address and/or data packets that implement data transfers, ownership transfers, and/or changes in access privileges.

As is described in more detail below, address network 150 is configured to transmit coherence requests corresponding to read or write memory operations using a point-to-point transmission mode. For coherence requests that are conveyed point-to-point by address network 150, a directory-based coherency protocol is implemented. In some embodiments, address network 150 may be configured to selectively transmit coherence requests in either point-to-point mode or broadcast mode. In such embodiments, when coherence requests are conveyed using a broadcast mode transmission, a snooping broadcast coherency protocol is implemented.

In embodiments supporting both point-to-point and broadcast transmission modes, clients transmitting a coherence request to address network 150 may be unaware of whether the coherence request will be conveyed within computer system 140 via a broadcast or a point-to-point mode transmission. In such an embodiment, address network 150 may be configured to determine whether a particular coherence request is to be conveyed in broadcast (BC) mode or point-to-point (PTP) mode. In the following discussion, an embodiment of address network 150 that includes a table for classifying coherence requests as either BC mode or PTP mode is described.

Hybrid Network Switch

Figure 2:
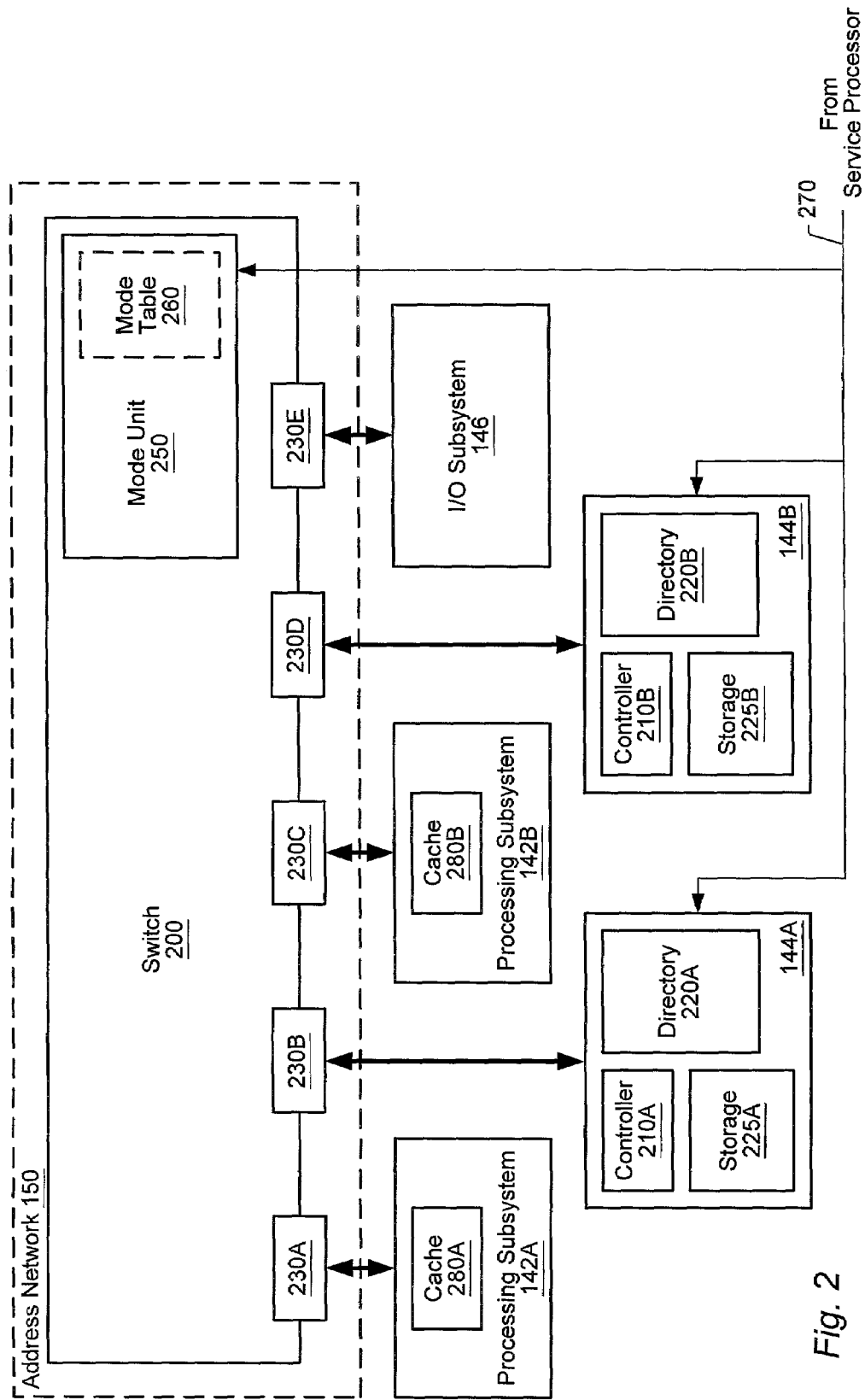
FIG. 2 is a diagram illustrating a portion of one embodiment of a computer system.

FIG. 2 is a diagram illustrating a portion of one embodiment of computer system 140. FIG. 2 shows address network 150, memory subsystems 144, processing subsystems 142, and I/O subsystem 146. In the embodiment shown, address network 150 includes a switch 200 including a mode control unit 250 and ports 230A–230E. Mode unit 250 illustratively includes a mode table 260 configured to store an indication of a mode of conveyance, BC or PTP, for received coherence requests. Mode unit may include special task oriented circuitry (e.g., an ASIC) or more general purpose processing circuitry executing software instructions. Processing units 142A–142B each include a cache 280 configured to store memory data. Memory subsystems 144A and 144B are coupled to switch 200 via ports 230B and 230D, respectively, and include controller circuitry 210, directory 220, and storage 225. In the embodiment shown, ports 230 may include bi-directional links or multiple unidirectional links. Storage 225 may include RAM or any other suitable storage device.

Also illustrated in FIG. 2 is a network 270 (e.g., a switched network or bus) coupled between a service processor (not shown), switch 200 and memory subsystems 144. The service processor may utilize network 270 to configure and/or initialize switch 200 and memory subsystems 144, as will be described below. The service processor may be external to computer system 140 or may be a client included within computer system 140. Note that embodiments of computer system 140 that only implement a PTP transmission mode may not include mode unit 250, network 270, and/or a service processor.

As previously described, address network 150 is configured to facilitate communication between clients within computer system 140. In the embodiment of FIG. 2, processing subsystems 142 may perform reads or writes which cause transactions to be initiated on address network 150. For example, a processing unit within processing subsystem 142A may perform a read to a memory location A that misses in cache 280A. In response to detecting the cache miss, processing subsystem 142A may convey a read request for location A to switch 200 via port 230A. The read request initiates a read transaction. Mode unit 250 detects the read request for location A and determines the transmission mode corresponding to the read request. In embodiments utilizing a mode table, the mode unit determines the transmission mode by consulting mode table 260. In one embodiment, the read request includes an address corresponding to location A that is used to index into an entry in mode table 260. The corresponding entry may include an indication of the home memory subsystem corresponding to location A and a mode of transmission corresponding to location A.

In the above example, location A may correspond to a memory location within storage 225A of memory subsystem 144A. Consequently, the entry in mode table 260 corresponding to the read request may indicate memory subsystem 144A is a home subsystem of location A. If the entry in mode table 260 further indicates that the address of the read request is designated for PTP mode transmissions, switch 200 is configured to only convey a corresponding request to memory subsystem 144A via port 230B. On the other hand, if the entry in mode table 260 indicates a BC transmission mode, switch 200 may be configured to broadcast a corresponding request to each client within computer system 140. Thus, switch 200 may be configured to utilize either PTP or BC modes as desired. Consequently, in this particular embodiment a single encoding for a transaction conveyed by an initiating device may correspond to either a BC mode or PTP mode transaction. The mode may be determined not by the client initiating a transaction, but by the address network. The transmission mode associated with switch 200 may be set according to a variety of different criteria. For example, where it is known that a particular address space includes widely shared data, mode unit 250 may be configured to utilize BC mode transactions. Conversely, for data that is not widely shared, or data such as program code that is read only, mode unit 250 may be configured to utilize PTP mode. Further details regarding various other criteria for setting the mode of switch 200 will be described further below.

Transmission Mode Table

Turning to FIG. 3, one embodiment of a mode table 260 is shown. While the embodiment of FIG. 3 shows mode table 260 as being included within mode unit 250, mode table 260 may be external to mode unit 250. Mode table 260 may include a dynamic data structure maintained within a storage device, such as RAM or EEPROM. In the embodiment of FIG. 3, table 260 is depicted as including columns 502, 504 and 506, and rows 510. Each row 510 corresponds to a particular address space. For example, each row 510 may correspond to a particular page of memory or any other portion of address space. In one embodiment, the address space corresponding to a computer system 140 is partitioned into regions called "frames." These frames may be equal or unequal in size. Address column 502 includes an indication of the frame corresponding to each row 510. Home column 504 includes an indication of a home subsystem corresponding to each row 510. Mode column 506 includes an indication of a transmission mode, BC or PTP, corresponding to each row 510 (and thus each memory frame). Note that in some embodiments, there may not be an entry in home column 504 for BC mode address ranges.

In the embodiment shown in FIG. 3, entries in table 260 are directly mapped to a specific location. Therefore, row 510A corresponds to entry A, row 510B corresponds to entry B, and so on. In a direct mapped implementation, table 260 need not actually include address column 502; however, it is illustrated for purposes of discussion. Each row 510 in the embodiment shown corresponds to an address space of equal size. As stated previously, table 260 may be initialized by a service processor coupled to switch 200. Note that in other embodiments, table 260 may be organized in an associative or other manner.

As illustrated in FIG. 3, row 510A contains an entry corresponding to address region A (502). In one embodiment, mode unit 250 may utilize a certain number of bits of an address to index into table 260. For example, address "A" in row 510A may correspond to a certain number of most significant bits of an address space identifying a particular region. Alternatively, address "A" in row 510A may correspond to a certain number of significant bits and a certain number of less significant bits of an address space identifying a particular region, where the region contains non-consecutive cache lines, in order to facilitate interleaving of the cache lines. Row 510A indicates a home 504 subsystem corresponding to "A" is CLIENT 3. Further, row 510A indicates the mode 506 of transmission for transactions within the address space corresponding to region "A" is PTP. Row 510B corresponds to a region of address 502 space "B", has a home 504 subsystem of CLIENT 3, and a transmission mode 506 of BC. Each of the other rows 510 in table 260 includes similar information.

While the above description contemplates a mode unit 250 that includes a mode table 260 for determining a transmission mode corresponding to received address packets, other embodiments are possible as well. For example, mode unit 250 may be configured to select a transmission mode based on network traffic. In such an implementation, mode unit 250 may be configured to monitor link utilization and/or the state of input/output queues within switch 200. If mode unit 250 detects that network congestion is low, a packet may be broadcast to take advantage of available bandwidth. On the other hand, if the mode unit 250 detects that network congestion is high, a packet may be conveyed point-to-point in order to reduce congestion. In such embodiments, mode unit 250 may coordinate with a directory when switching between BC and PTP mode (e.g., a service processor may coordinate the mode unit and directory). Other embodiments may include tracking which address regions are widely shared and using broadcasts for those regions. If it is determined a particular address region is not widely shared or is read-only code, a point-to-point mode may be selected for conveying packets for those regions. Alternatively, a service processor coupled to switch 250 may be utilized to monitor network conditions. In yet a further embodiment, the mode unit 250 may be configured such that all coherence requests are serviced according to PTP mode transmissions or, alternatively, according to BC mode transmissions. For example, in scalable systems, implementations including large numbers of processors may be configured such that mode unit 250 causes all address packets to be serviced according to PTP mode transmissions, while implementations including relatively small numbers of processors may be set according to BC mode transmissions. These and other embodiments are contemplated.

As mentioned above, when switch 200 receives a coherence request, mode unit 250 utilizes the address corresponding to the received coherence request as an index into table 260. In the embodiment shown, mode unit 250 may utilize a certain number of most significant bits to form an index. The index is then used to select a particular row 510 of table 260. If the mode 506 indication within the selected row indicates PTP mode, a corresponding coherence request is conveyed only to the home subsystem indicated by the home 504 entry within the row. Otherwise, if the mode 506 entry indicates BC mode, a corresponding coherence request is broadcast to clients within the computer system. In alternative embodiments, different "domains" may be specified within a single computer system. As used herein, a domain is a group of clients that share a common physical address space. In a system where different domains exist, a transaction that is broadcast by switch 200 may be only broadcast to clients in the domain that corresponds to the received coherence request. Still further, in an alternative embodiment, BC mode coherence requests may be broadcast only to clients capable of caching data and to the home memory subsystem. In this manner, certain coherence requests that may be unnecessary may be avoided while still implementing a broadcast snooping style coherence protocol.

Directories

As stated previously, for coherence requests that are conveyed in point-to-point mode by switch 200, a directory based coherence protocol is implemented. As shown in FIG. 2, each memory subsystem 144 includes a directory 220 that is used to implement a directory protocol. FIG. 4 illustrates one example of a directory 220A that may be maintained by a controller 210A within a memory subsystem 144A. In this embodiment, directory 220A includes an entry 620 for each memory block within storage 225A for which memory subsystem 144A is the home subsystem. In general, a directory may include an entry for each coherency unit for which the memory subsystem is a home subsystem. As used herein, a "coherency unit" is a number of contiguous bytes of memory that are treated as a unit for coherency purposes. For example, if one byte within the coherency unit is updated, the entire coherency unit is considered to be updated. In some embodiments, the coherency unit may be a cache line or a cache block. Thus, in one embodiment, directory 220A maintains an entry 620 for each cache line whose home is memory subsystem 144A. In addition, directory 220A may include an entry for each client 604–612 within computer system 140 that may have a copy of the corresponding cache line. Directory 220A may also include an entry 614 indicating the current owner of the corresponding cache line. Each entry in directory 220A indicates the coherency state of the corresponding cache line in each client in the computer system. In the example of FIG. 4, a region of address space corresponding to a frame "A" may be allocated to memory subsystem 144A. Typically, the size of frame A may be significantly larger than a coherency unit. Consequently, directory 220A may include several entries (i.e., Aa, Ab, Ac, etc.) that correspond to frame A.

It is noted that numerous alternative directory formats to support directory based coherency protocols may be implemented. For example, while the above description includes an entry 604–612 for each client within a computer system, an alternative embodiment may only include entries for groups of clients. For example, clients within a computer system may be grouped together or categorized according to various criteria. For example, certain clients may be grouped into one category for a particular purpose while others are grouped into another category. In such an embodiment, rather than including an indication for every client in a group, a directory within a memory subsystem 144 may include an indication as to whether any of the clients in a group have a copy of a particular coherency unit. If a request is received for a coherency unit at a memory subsystem 144 and the directory indicates that a group "B" may have a copy of the coherency unit, a corresponding coherency transaction may be conveyed to all clients within group "B." By maintaining entries corresponding to groups of clients, directories 220 may be made smaller than if an entry were maintained for every client in a computer system.

Other directory formats may vary the information stored in a particular entry depending on the current number of sharers. For example, in some embodiments, a directory entry may include a pointer to a client device if there is a single sharer. If there are multiple sharers, the directory entry may be modified to include a bit mask indicating which clients are sharers. Thus, in one embodiment, a given directory entry may store either a bit mask or a pointer depending on the number of sharers.

By maintaining a directory as described above, appropriate coherency actions may be performed by a particular memory subsystem (e.g., invalidating shared copies, requesting transfer of modified copies, etc.) according to the information maintained by the directory. A controller 210 within a subsystem 144 is generally configured to perform actions necessary for maintaining coherency within a computer system according to a specific directory based coherence protocol. For example, upon receiving a request for a particular coherency unit at a memory subsystem 144, a controller 210 may determine from directory 220 that a particular client may have a copy of the requested data. The controller 210 may then convey a message to that particular client which indicates the coherency unit has been requested. The client may then respond with data (e.g., if the coherency unit is modified) or with an acknowledgement or any other message that is appropriate to the implemented coherency protocol. In general, memory subsystems 144 maintain a directory and controller suitable for implementing a directory-based coherency protocol. As used herein, a directory based cache coherence protocol is any coherence protocol that maintains a directory containing information regarding cached copies of data, and in which coherence commands for servicing a particular coherence request are dependent upon the information contained in the directory.

General Operations

Figure 5:
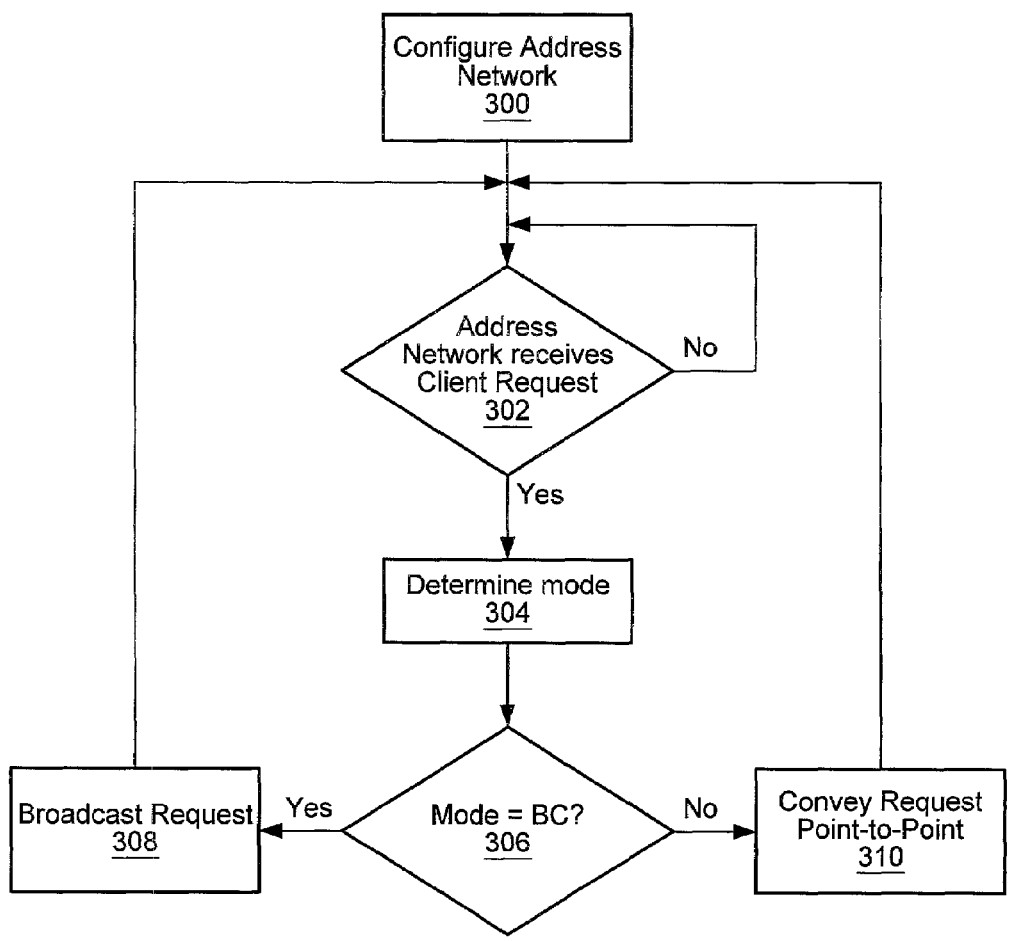
FIG. 5 illustrates one embodiment of a method for mixed mode determination and transmission.

Turning next to FIG. 5, one embodiment of a method for mixed mode determination and transmission is illustrated. An address network within a computer system is initially configured (block 300). Such configuration may include initializing a mode control unit and/or a mode table via a service processor. During system operation, if the address network receives a coherence request from a client (decision block 302), the address network determines the transmission mode (block 304) corresponding to the received request. In the embodiment described above, the mode control unit 250 makes this determination by accessing a mode table 260. If the mode corresponding to the request is determined to be BC mode (decision block 306), a corresponding request is broadcast to clients in the computer system. In contrast, if the mode corresponding to the request is determined to be PTP mode (decision block 306), a corresponding request is conveyed point-to-point to the home subsystem corresponding to the request and (not unconditionally) to other clients within the computer system.

During operation, it may be desirable to change the configuration of switch 200 to change the transmission mode for certain address frames (or for the entire computer system). For example, a mode unit 250 within switch 200 may be initially configured to classify a particular region of address space with a PTP mode. Subsequently, during system operation, it may be determined that the particular region of address space is widely shared and modified by different clients within the computer system. Consequently, significant latencies in accessing data within that region may be regularly encountered by clients. Thus, it may be desirable to change the transmission mode to broadcast for that region. While transmission mode configuration may be accomplished by user control via a service processor, a mechanism for changing modes dynamically may alternatively be employed.

As stated previously, numerous alternatives are contemplated for determining when the transmission mode of a coherence request or a region of address space may be changed. For example, in one embodiment an address switch or service processor may be configured to monitor network congestion. When the switch detects congestion is high, or some other condition is detected, the switch or service processor may be configured to change the modes of certain address regions from BC to PTP in order to reduce broadcasts. Similarly, if the switch or service processor detects network congestion is low or a particular condition is detected, the modes may be changed from PTP to BC.

Figure 6:
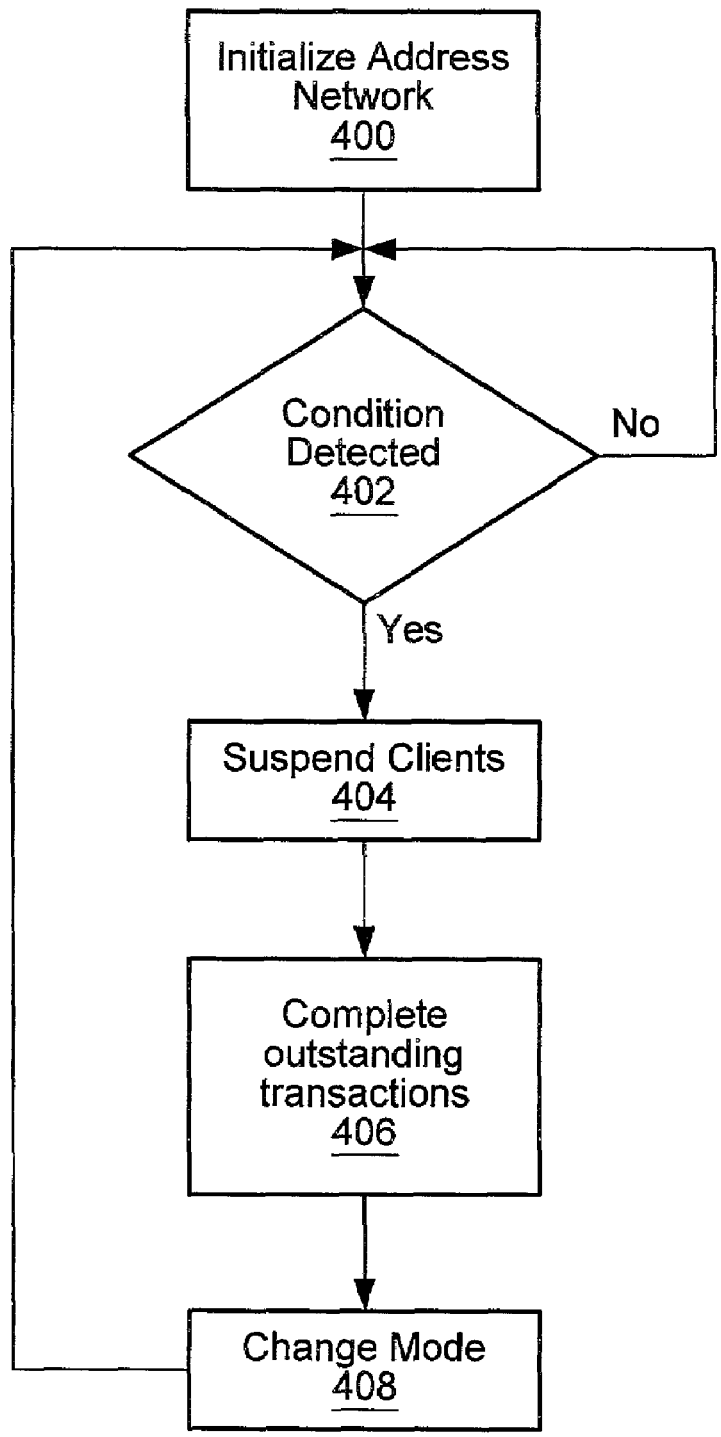
FIG. 6 illustrates one embodiment of a method for dynamically changing transmission modes.

FIG. 6 illustrates one embodiment of a method for dynamically changing transmission modes corresponding to coherence requests within an address network. An initial address network configuration (block 400) is performed which may include configuring a mode table 260 as described above or otherwise establishing a mode of transmission for transactions. During system operation, a change in the transmission mode of switch 200 may be desired in response to detection of a particular condition, as discussed above (decision block 402). In the embodiment shown, when the condition is detected (decision block 402), new client transactions are temporarily suspended (block 404), outstanding transactions within the computer system are allowed to complete (block 408), and the mode is changed (block 410). In one embodiment, changing the mode may include updating the entries of mode table 260 as described above. It is further noted that to accommodate transitions from broadcast mode to point-to-point mode, directory information (e.g., information which indicates an owning subsystem) may be maintained even for broadcast mode coherence requests.

Generally speaking, suspending clients (block 404) and allowing outstanding transactions within the computer system to complete (block 408) may be referred to as allowing the computer system to reach a quiescent state. A quiescent state may be defined as a state when all current traffic has reached its destination and there is no further traffic entering the computer system. Alternative embodiments may perform mode changes without requiring a computer system to reach a quiescent state. For example, rather than waiting for all transactions to complete, a mode change may be made upon arrival of all pending address packets at their destination devices (but while data packets are still being conveyed). Further, in embodiments which establish transmission modes on the basis of regions of memory, as in the discussion of frames above, a method may be such that only those current transactions which correspond to the frame whose mode is being changed need only complete. Various alternatives are possible and are contemplated.

Coherence Transactions

In one embodiment of computer system 140, read-to-share (RTS) transactions may be initiated by active devices upon address network 150 by requesting read-only copies of coherency units. Similarly, read-to-own (RTO) transactions may be initiated by active devices requesting writable copies of coherency units. Other coherence transactions may similarly be initiated by active devices upon address network 150, as desired. These coherence requests may be conveyed in either PTP or BC mode in some embodiments, as described above.

FIG. 7 is a chart illustrating various coherence requests, including a description of each, that may be supported by one embodiment of computer system 140. As illustrated, in addition to read-to-share and read-to-own requests, further coherence requests that may be supported include read-stream (RS) requests, write-stream (WS) requests, write-back (WB) requests, and write-back-shared (WBS) requests. A read-stream request initiates a transaction to provide a requesting device with a read-once copy of a coherency unit. A write-stream request initiates a transaction to allow a requesting device to write an entire coherency unit and send the coherency unit to memory. A write-back request initiates a transaction that sends a coherency unit from an owning device to memory, where the owning device does not retain a copy. Finally, a write-back-shared request initiates a transaction that sends a coherency unit from an owning device to memory, where the owning device retains a read-only copy of the coherency unit. Active devices may also be configured to initiate other transaction types on address network 150 such as I/O read and write transactions and interrupt transactions using other requests. For example, in one embodiment, a read-to-write-back (RTWB) transaction may also be supported to allow I/O bridges (or other devices) to perform a write to part of a coherency unit without gaining ownership of the coherency unit and responding to foreign requests for the coherency unit.

It is noted that transactions may be initiated upon address network 150 by sending encoded packets that include a specified address. Data packets conveyed on data network 152 may be associated with corresponding address transactions using transaction IDs, as discussed below.

In one embodiment, cacheable transactions may result in at least one packet being received by the initiating client on the data network 152. Some transactions may require that a packet be sent from the initiating client on the data network 152 (e.g., a write-back transaction). FIG. 8 illustrates data packet transfers on data network 152 that may result from various transactions in accordance with one embodiment of computer system 140. A PRN data packet type is a pull request, sent from the destination of a write transaction to the source of the write transaction, to send data. An ACK data packet type is a positive acknowledgment from an owning device allowing a write stream transaction to be completed. A NACK data packet type is a negative acknowledgment to memory aborting a WB, WBS, or to the initiator aborting an INT transaction.

When an initiator initiates a transaction, the address packet for that transaction may include a transaction ID. In one embodiment, the transaction ID may be formed by the initiator's device ID and a packet ID assigned by the initiator. The DATA, ACK and/or PRN packets that the initiator receives may be routed to the initiator through data network 152 by placing the initiator's device ID in the packets' routing prefixes. In addition, the DATA, ACK and/or PRN packets may contain a destination packet ID field which matches the packet ID assigned by the initiator, allowing the initiator to match the DATA, ACK, and/or PRN packet to the correct transaction. Furthermore, PRN packets may include a pull ID consisting of the source's device ID and a packet ID assigned by the source (that is, the client which sent the PRN packet). After receiving a PRN packet, the initiator may send a DATA or NACK packet to the source of the PRN. This DATA or NACK packet may be routed by placing the device ID of the source of the PRN in the packet's routing prefix. The DATA or NACK packet may contain a destination packet ID field that allows it to be matched with the correct PRN (in addition, the packet may include a flag which indicates that it was sent in response to a PRN, thus preventing confusion between transaction IDs and pull IDs).

In one embodiment, an ACK packet sent in response to a WS may not contain any data. The ACK packet may be used to indicate the invalidation of the previous owner. The PRN packet that an initiator receives as part of a cacheable transaction is sent by the memory device that maps the coherency unit. The DATA or NACK packet that the initiator sends is sent to the memory device that maps the coherency unit (which is also the source of the PRN received by the initiator).

As illustrated in FIG. 8, the initiator may receive separate DATA and PRN packets for a RTWB transaction. However, when the owner of the coherency unit is the memory device that maps the coherency unit, these two packets would be sent by the same client. Thus, in one embodiment, instead of sending two packets in this situation, a single DATAP packet may be sent. A DATAP package combines the information of a DATA packet and a PRN packet. Similarly, a single PRACK packet, which combines the information of a PRN packet and an ACK packet, may be sent in response to a WS request when the owner of the coherency unit is the memory device that maps the coherency unit. Finally, in those cases where the initiator is the owner of the coherency unit, the initiator may not send a DATA or ACK packet to itself (logically, this can be viewed as a transmission of a DATA or ACK packet from the initiator to itself which does not leave the initiator). Similarly, in those cases where the initiator is the memory device that maps the coherency unit, the initiator may not send a PRN packet to itself, nor need it send a DATA or NACK packet to itself.

In the embodiment of FIG. 1, non-cacheable transactions may similarly result in at least one packet being received by the initiating client from the data network, and some transactions may require that a packet be sent from the initiating client device on the data network. FIG. 9 illustrates various non-cacheable transaction types that may be supported in one embodiment of computer system 140, along with resulting data packet types that may be conveyed on data network 152. The columns in FIG. 9 are indicative of the sequence of packets sent on the address and data networks, in order from left to right.

The DATA, PRN, or NACK packets that an initiator may receive as part of non-cacheable transactions are routed to the initiator through data network 152 and may be matched to the correct transaction at the receiver through the use of transaction IDs, as was described for cacheable data transfers. Similarly, the DATA packets that the initiator sends may be routed to their destination and matched to the correct transaction at their destination through the use of pull IDs, as was described for cacheable transactions.

For RIO and WIO transactions, the DATA, and/or PRN packets that the initiator receives are sent from the client that maps the coherency unit. For INT transactions, the PRN or NACK packet that the initiator receives is sent from the target of the interrupt (which may be specified in an address field of the INT packet). When the initiator sends a DATA packet, it sends the DATA packet to the source of the PRN that it received. It is noted that when the initiator would be both the source and destination of a DATA, PRN, or NACK packet, no DATA, PRN, or NACK packet needs to be sent. It is also noted that when an initiator receives a PRN packet in response to an INT transaction, the initiator sends a data packet. When the initiator receives a NACK packet as part of an INT transaction, the initiator may not send any packet on the data network.

Coherency Mechanism

Computer system 140 employs a cache coherence protocol to provide a coherent view of memory for clients with caches. For this purpose, state information for each coherency unit may be maintained in each active device. The state information specifies the access rights of the active device and the ownership responsibilities of the active device.

The access right specified by the state information for a particular coherency unit is used to determine whether the client device can commit a given operation (i.e., a load or a store operation) and constraints on where that operation can appear within one or more partial or total orders. In one embodiment, the memory access operations appear in a single total order called the "global order." In such an embodiment, these constraints upon where an operation can be placed in the global order can be used to support various well-known memory models, such as, for example, a sequentially consistent memory model or total-store-order (TSO), among others.

The ownership responsibility specified by the state information for a particular coherency unit indicates whether the client device is responsible for providing a copy of the coherency unit to another client that requests it. A client device owns a coherency unit if it is responsible for providing data to another client which requests that coherency unit.

In one embodiment, the coherence protocol employed by computer system 140 is associated with the following properties:

1) Changes in ownership status occur in response to the reception of address packets. Sending address packets, sending data packets, and receiving data packets do not affect the ownership status;

2) An active device may own a coherency unit without having the data associated with that ownership responsibility;

3) Access rights transition with receiving address packets, sending data packets, and receiving data packets. Sending address packets does not affect the access rights (although it may affect the way in which other packets are processed);

4) An active device which has an access right to a coherency unit always has the data associated with that access right; and 5) Reception of address packets is not blocked based on the reception of particular data packets. For example, it is possible to receive a local read request packet before the data being requested is also received.

Since access rights and ownership status can transition separately in the protocol employed by computer system 140, various combinations of coherence states are possible. FIGS. 10A and 10B illustrate types of access rights and ownership status that may occur in one embodiment of computer system 140. FIG. 10C illustrates possible combinations of access rights and ownership status. It is noted that these combinations differ from those of traditional coherence protocols such as the well-known MOSI protocol. It is also noted that other specific forms of access rights may be defined in other embodiments.

As illustrated in FIG. 10A, the W (Write) access right allows both reads and writes. The A (All-Write) access right allows only writes and requires that the entire coherency unit be written. The R (Read) access right allows only reads. The T (Transient-Read) access right allows only reads; however, unlike reads performed under the W or R access rights, reads performed under the T access right may be reordered, as discussed below. Finally, the I (Invalid) access right allows neither reads nor writes. When the system is first initialized, all active devices have the I access right for all coherency units. As will be discussed further below, when a coherency unit is in the A access right state, because the entire coherency unit must be modified, the data contained in the coherency unit prior to this modification is not needed and may not be present. Instead, an ACK packet, which acts as a token representing the data, must have been received if the data is not present.

As illustrated in FIG. 10B, an active device may have an O (owner) ownership status or an N (non-owner) ownership status with respect to a given coherency unit. In either state, data corresponding to the coherency unit may or may not be present in the cache.

Once an active device has acquired a given access right, it may exercise that access right repeatedly by performing multiple reads and/or writes until it loses the access right. It is noted that for access rights other than A (All-Write), an active device is not required to exercise its read and/or write access rights for a given coherency unit. In contrast, the A access right requires that the entire coherency unit be written, so the active device must perform at least one write to each byte in the coherency unit.

In the embodiment of FIG. 1, changes in access rights may occur in response to receiving address packets, sending data packets, or receiving data packets. Generally speaking, and as will be described in further detail below, when a transaction transfers exclusive access to a coherency unit from a processor P1 to a processor P2, the sending of the data from P1 terminates P1's access right to the coherency unit and the reception of the data at P2 initiates P2's access right. When a transaction changes exclusive access to a coherency unit at a processor P1 to a shared state with a processor P2 (i.e., each having a read access right), the sending of the data from P1 terminates P1's write access right (though it can continue to read the coherency unit) and the arrival of the data at P2 initiates its shared access right. When a transaction transfers a coherency unit from a shared state to exclusive access at a processor P2, the access rights at all processors other than P2 and the processor which owns the coherency unit (if any) are terminated upon reception of the coherence request, the access right of the processor that owns the coherency unit (if there is one) is terminated when it sends the data, and the write access right at P2 is initiated once P2 has received the data from the previous owner (or from memory) and has received the coherence request. Finally, when a coherence request adds a processor P2 to a set of processors that is already sharing a coherency unit, no processor loses access rights and P2 gains the read access right when it receives the data.

Ownership responsibilities may transition in response to the reception of address packets. In the embodiment of FIG. 1, sending and receiving data packets do not affect ownership responsibilities. FIG. 11 is a chart illustrating ownership transitions in response to particular transactions in one embodiment of computer system 140. In FIG. 11, "previous owner" indicates that ownership is unchanged, "initiator" indicates that the client which initiated the transaction becomes the owner, and "memory" indicates that the memory subsystem 144 which maps the coherency unit becomes the owner. The owner of the coherency unit is either an active device or the memory device that maps the coherency unit. Given any cacheable transaction T which requests a data or ACK packet, the client that was the owner of the coherency unit immediately preceding T will send the requested data or ACK packet. When the system is first initialized, memory is the owner for each coherency unit.

FIG. 4A shows an exemplary directory 220B that may store information regarding the access rights and ownership responsibilities held by various client devices for each coherency unit mapped by the directory. Instead of storing information related to the MOSI states (as shown in FIG. 4), directory 220B stores information relating to the coherence protocol described above. Thus, directory 220B identifies which client device, if any, has an ownership responsibility for a particular coherency unit. Directory 220B may also track which client devices have a shared access right to the coherency unit. For example, a directory entry 620 may indicate the access rights of each client device (e.g., read access R, write access W, or invalid access I) to a coherency unit. Note that in other embodiments, additional or different information may be included in a directory 220B. Furthermore, some directories may include less information. For example, in one embodiment, a directory may only maintain information regarding ownership responsibilities for each coherency unit.

Virtual Networks and Ordering Points

In some embodiments, address network 150 may include four virtual networks: a Broadcast Network, a Request Network, a Response Network, and a Multicast Network. Each virtual network is unordered with respect to the other virtual networks. Different virtual networks may be configured to operate in logically different ways. Packets may be described in terms of the virtual network on which they are conveyed. In the following discussion, a packet is defined to be "received" (or "sent") when any changes in ownership status and/or access rights in response to the packet at the receiving client (or the sending client) have been made, if necessary, pursuant to the coherence protocol.

The Broadcast Network may implement a logical broadcast medium between client devices within a computer system and only convey packets for BC mode transactions. In one embodiment, the Broadcast Network may satisfy the following ordering properties:

1) If a client C1 sends a broadcast packet B1 for a non-cacheable or interrupt address before sending a broadcast packet B2 for a non-cacheable or interrupt address, and if a client C2 receives packets B1 and B2, then C2 receives B1 before it receives B2.
2) If clients C1 and C2 both receive broadcast packets B1 and B2, and if C1 receives B1 before it receives B2, then C2 receives B1 before it receives B2.

The Request Network may implement a logical point-to-point medium between client devices in a computer system and may only convey packets for PTP mode transactions. In one embodiment, coherence requests sent on the Request Network are sent from the client device that initiates a transaction to the device that maps the memory location corresponding to the transaction. The request network may implement the following ordering property:

1) If a client C1 sends a request packet R1 for a non-cacheable or interrupt address before sending a request packet R2 for a non-cacheable or interrupt address, and if a client C2 receives request packets R1 and R2, then C2 receives R1 before it receives R2.

The Response Network may also implement a logical point-to-point medium between active devices in a computer system and may only be used for PTP mode transactions. Packets sent on the Response Network may implement requests for data transfers and changes of ownership. In one embodiment, packets sent on the Response Network are only sent to requesting and/or owning clients. The Response Network may implement the following ordering property:

1) If a client C1 sends a response packet R1 before sending a response packet R2, and if a client C2 receives packets R1 and R2, then C2 receives R1 before it receives R2.

Finally, the Multicast Network may implement a logical point-to-multipoint medium between client devices in a computer system and is used only for PTP mode transactions. In one embodiment, packets sent on the Multicast Network are sent to the requesting client and non-owning sharers in order to implement changes in access rights. Packets on the Multicast Network may also be sent to additional clients in some embodiments. For example, a computer system may be divided into N portions, and a directory may indicate whether there are non-owning devices that have shared copies of a given coherency unit in each of the N portions. If a single non-owning device in a given portion has shared access to a coherency unit, a multicast may be sent to each device in that portion. The Multicast Network may not implement any ordering properties between different packets sent on the Multicast Network.

In the embodiment of computer system 140 discussed above, various ordering points are established within the computer system. These ordering points govern ownership and access right transitions. One such ordering point is the Broadcast Network. The Broadcast Network is the ordering point for cacheable and non-cacheable BC mode transactions corresponding to a given memory block. All clients in a computer system or domain receive broadcast packets for a given memory block in the same order. For example, if clients C1 and C2 both receive broadcast packets B1 and B2, and C1 receives B1 before B2, then C2 also receives B1 before B2.

In other situations, a client may serve as an ordering point. More particularly, in the embodiment described above, for cacheable PTP mode address transactions, the order in which requests are serviced by the home memory subsystem directory establishes the order of the PTP mode transactions. Ordering for non-cacheable PTP mode address transactions may be established at the target of each non-cacheable transaction.

Packets in the same virtual network are subject to the ordering properties of that virtual network. Thus, packets in the same virtual network may be partially or totally ordered with respect to each other. However, packets in different virtual networks may be unordered with respect to each other. For example, a packet sent on the Multicast network may overtake a packet sent on the Response network and vice versa.

In addition to supporting various virtual networks, computer system 140 may be configured to implement the Synchronized Networks Property. The Synchronized Networks Property is based on the following orders:

1) Local Order ($<_l$): Event X precedes event Y in local order, denoted $X<_l Y$, if X and Y are events (including the sending or reception of a packet on the address or data network, a read or write of a coherency unit, or a local change of access rights) which occur at the same client device C and X occurs before Y.

2) Message Order ($<_m$): Event X precedes event Y in message order, denoted $X<_m Y$, if X is the sending of a packet M on the address or data network and Y is the reception of the same packet M.

3) Invalidation Order ($<_i$): Event X precedes event Y in invalidation order, denoted $X<_i Y$, if X is the reception of a broadcast or multicast packet M at a client device C1 and Y is the reception of the same packet M at a client C2, where C1 does not equal C2, and where C2 is the initiator of the transaction that includes the multicast or broadcast packet.

Using the orders defined above, the Synchronized Networks Property holds that:

1) The union of the local order $<_l$, the message order $<_m$, and the invalidation order $<_i$ is acyclic.

The Synchronized Networks Property may also be implemented in embodiments of address network 150 that do not support different virtual networks.

Coherence Transactions in Broadcast (BC) Mode

The following discussion describes how one embodiment of computer system 140 may perform various coherence transactions for coherency units in BC mode. In one embodiment of a computer system supporting both BC and PTP modes, BC mode address packets may be conveyed on a broadcast virtual network like the one described above.

Figure 12C:
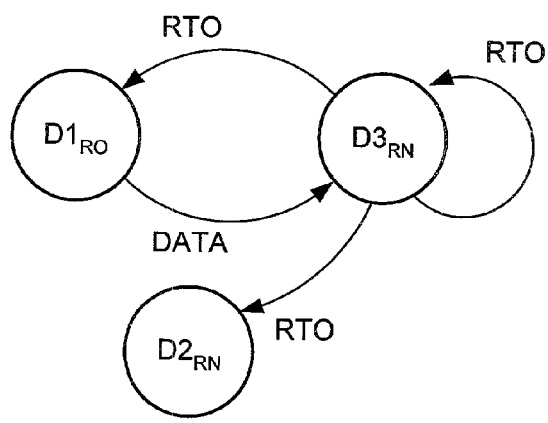

The transitioning of access rights and ownership responsibilities of client devices for coherency transactions in BC mode may be better understood with reference to the exemplary coherence operations depicted in FIGS. 12A–12F. Note that the examples shown in FIGS. 12A–12F are merely exemplary. For simplicity, these examples show devices involved in a particular transaction and do not show other devices that may also be included in the computer system. FIG. 12A illustrates a situation in which an active device D1 has a W (write) access right and ownership (as indicated by the subscript "WO"). An active device D2 (which has an invalid access right and is not an owner, as indicated by the subscript "IN") initiates an RTS in order to obtain the R access right. In this case, D1 will receive the RTS packet from D2 through address network 150. Since the RTS packet is broadcast, D2 (and any other client devices in computer system 140) also receives the RTS packet through address network 150. In response to the RTS, D1 sends a corresponding data packet (containing the requested data) to device D2. It is noted that D1 can receive additional address and data packets before sending the corresponding data packet to D2. When D1 sends the corresponding data packet to D2, D1 loses its W access right and changes its access right to an R access right. When D2 receives the corresponding data packet, it acquires an R access right. D1 continues to maintain ownership of the coherency unit.

FIG. 12B illustrates a situation in which an active device D1 has a W access right and ownership (as indicated by the subscript "WO"), and an active device D2 (which has invalid access and no ownership) initiates an RTO transaction in order to obtain a W access right. In this case, D1 will receive the RTO packet from D2 over address network 150. As a result, D1 changes its ownership status to N (not owner) and sends a corresponding data packet to D2. It is noted, however, that D1 can receive additional address and/or data packets before sending the corresponding data packet to D2. D2 also receives its own RTO via address network 150 since the RTO is broadcast. When D1 sends the corresponding data packet to D2, D1 loses its W access right and changes its right to an I access right. When D2 receives its own RTO via address network 150, its ownership status changes to O (owned). When D2 receives the corresponding data packet, it acquires a W access right.

FIG. 12C illustrates a situation in which an active device D1 has a read (R) access right to and ownership of a particular coherency unit. Active devices D2 and D3 also have an R access right to the coherency unit. Devices D2 and D3 do not have an ownership responsibility for the coherency unit. Active device D3 sends an RTO in order to obtain a W access right. In this case, D1 will receive the RTO from D3 via address network 150. Upon receipt of the RTO address packet, D1 changes its ownership status to N (no ownership) and sends a corresponding data packet (DATA) to D3. It is noted, however, that D1 can receive additional address and data packets before sending the corresponding data packet to D3. When D1 sends the corresponding data packet to D3, D1 changes its access right to an I access right. In addition, D2 will also receive the RTO via address network 150. When D2 receives the RTO, it changes its R access right to an I access right. Furthermore, when D3 receives its own RTO via address network 150, its ownership status is changed to O. When D3 receives the corresponding data packet (DATA) from D1, it acquires a W access right to the coherency unit. It is noted that the corresponding data packet and its own RTO may be received by D3 before the invalidating RTO packet arrives at D2. In this case, D2 could continue to read the coherency unit even after D3 has started to write to it.

Figure 12D:
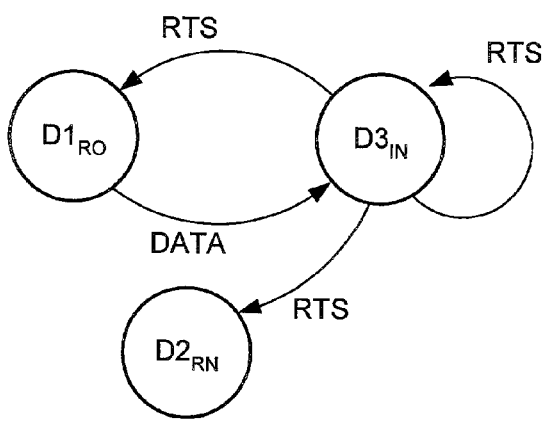

FIG. 12D illustrates a situation in which an active device D1 has an R access right and ownership of a particular coherency unit, active device D2 has an R access right (but not ownership) to the coherency unit, and active device D3 issues an RTS in order to obtain the R access right to the coherency unit. In this case, D1 will receive the RTS from D3 via the address network 150. In response to the RTS, D1 sends a corresponding data packet to D3. When D3 receives the corresponding data packet, its access right changes from an I access right to an R access right. The reception of the RTS at D1 and D2 does not cause a change in the access rights at D1 or D2. Furthermore, receipt of the RTS address packet at D1 and D2 does not cause any change in ownership for the coherency unit.

In the case of WS (Write Stream) transaction in which an entire coherency unit is written by an active device and sent to memory, the device initiating the WS may receive an ACK packet from the processing subsystem 142 (or memory subsystem 144) that most recently (in address broadcast order) owned the coherency unit. It is noted that this ACK packet may be sent in place of a regular data message (and in fact a data packet may be used), and that only one such ACK message may be sent in response to the WS.

Figure 12E:
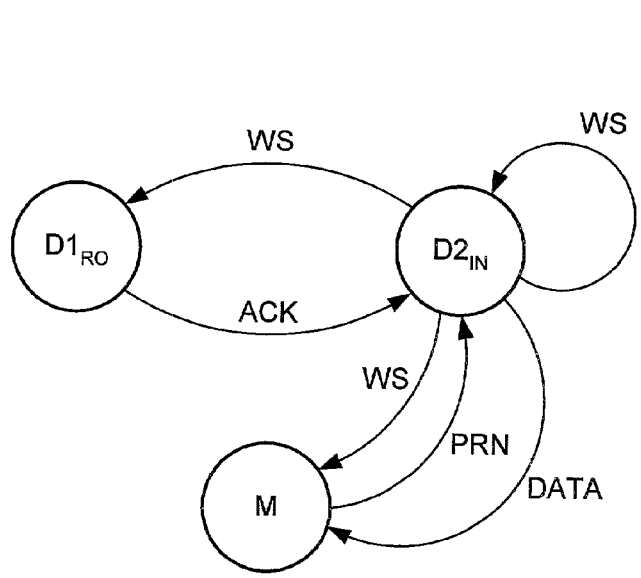

FIG. 12E illustrates a situation in which an active device D1 has an R access right and ownership of a coherency unit and an active device D2 initiates a WS transaction for that coherency unit. As shown, the WS request is received by D1 as well as the home memory subsystem 144 that maps the coherency unit through address network 150. In response to D2's WS packet, D1 sends a corresponding ACK packet to D2 (e.g., on data network 152). It is noted, however, that D1 can receive additional address and data packets before sending the corresponding ACK packet to D2. When D1 sends the corresponding ACK packet to D2, D1 changes its access right to an I access right. When D2 receives the ACK packet from D1, its access right changes to A (All-Write). In addition, the memory subsystem (M) that maps the coherency unit forwards a PRN packet on data network 152 to D2. When D2 writes to the entire coherency unit, D2 forwards a data packet to the memory subsystem M. Upon receipt of the WS request through address network 150, D1 changes its ownership status to N (not-owned), and the memory subsystem M changes its ownership status to owned.

Figure 12F:
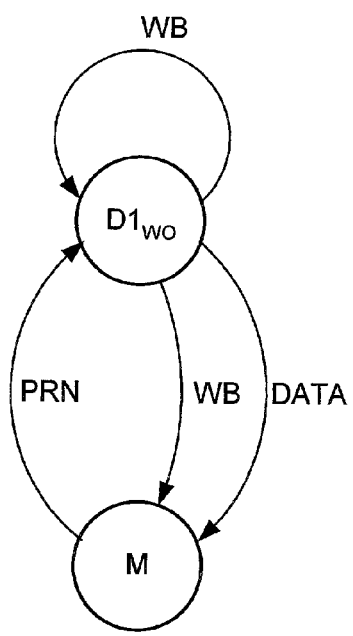

FIG. 12F illustrates a situation in which an active device D1 has a W access right and ownership of a coherency unit and initiates a WB transaction in order to write that coherency unit back to memory. The memory subsystem (M) that maps the coherency unit receives the WB packet through address network 150, and responsively forwards a PRN packet through data network 152 to D1. As a result, D1 sends a corresponding data packet (DATA) to memory M. It is noted that D1 can receive additional address and/or data packets before sending the corresponding data packet to memory M. When D1 receives its own WB through address network 150, its ownership status changes to N. When D1 sends the corresponding data packet to memory M, its access right is changed to an I access right. In response to receiving the WB packet on the address network 152, memory M may become the owner of the coherence unit. WBS (write back shared) transactions may be handled similarly.

It is contemplated that numerous variations of computer systems may be designed that employ the principle rules for changing access rights in active devices as described above while in BC mode. Such computer systems may advantageously maintain cache consistency while attaining efficient operation. It is noted that embodiments of computer system 140 are possible that implement subsets of the transactions described above in conjunction with FIGS. 12A–12F. Furthermore, other specific transaction types may be supported, as desired, depending upon the implementation.

It is also noted that variations with respect to the specific packet transfers described above for a given transaction type may also be implemented. Additionally, while ownership transitions are performed in response to receipt of address packets in the embodiments described above, ownership transitions may be performed differently during certain coherence transactions in other embodiments.

In addition, in accordance with the description above, an owning device may not send a corresponding data packet immediately in response to receiving a packet (such as an RTO or RTS) corresponding to a transaction initiated by another device. In one embodiment, a maximum time period (e.g., maximum number of clock cycles, etc.) may be used to limit the overall length of time an active device may expend before sending a responsive data packet.

Coherence Transactions in Point-to-Point (PTP) Mode

FIGS. 13A–13G illustrate how various coherence transactions may be carried out in PTP mode. In the following discussion, a variety of scenarios are depicted illustrating coherency activity in a computer system utilizing one exemplary directory-based coherency protocol, although it is understood that other specific protocols may alternatively be employed. In some embodiments, PTP-mode address packets may be conveyed in one of three virtual networks: the Request Network, the Response Network, and the Multicast Network.

In one embodiment of a computer system that implements PTP mode transactions on address network 150, a device may initiate a transaction by sending a request packet on the Request Network. The Request Network may convey the request packet to the device that maps the coherency unit (the home subsystem for that coherency unit) corresponding to the request packet. In response to receiving a request packet, the home subsystem may send one or more packets on the Response, Multicast, and/or Data Networks.

Figure 13A:
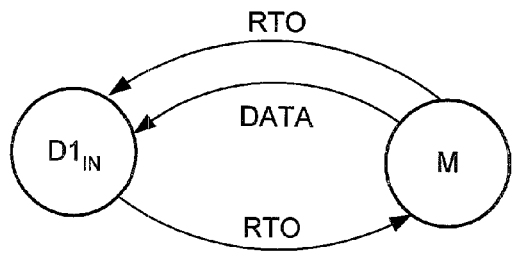

FIG. 13A is a diagram depicting coherency activity for an exemplary embodiment of computer system 140 as part of a read-to-own (RTO) transaction upon address network 150. A read-to-own transaction may be performed when a cache miss is detected for a particular coherency unit requested by a processing subsystem 142 and the processing subsystem 142 requests write permission to the coherency unit. For example, a store cache miss may initiate an RTO transaction. As another example, a prefetch for a write may initiate an RTO transaction.

In FIG. 13A, the requesting device D1 initiates a read-to-own transaction. D1 has the corresponding coherency unit in an invalid state (e.g., the coherency unit is not stored in the device) and is not the owner of the corresponding coherency unit, as indicated by the subscript "IN." The home memory subsystem M is the owner of the coherency unit. The read-to-own transaction generally causes transfer of the requested coherency unit to the requesting device D1.

Upon detecting a cache miss, the requesting device D1 sends a read-to-own coherence request (RTO) on the address network 150. Since the request is in PTP mode, address network 150 conveys the request to the home memory subsystem M of the coherency unit. In some embodiments, home memory subsystem M may block subsequent transactions to the requested coherency unit until the processing of the RTO transaction is completed at M. In one embodiment, home memory subsystem may include an address agent to process address packets and a data agent that processes data packets (e.g., the data agent may send a data packet in response to a request from the address agent). In such an embodiment, the home memory subsystem may unblock subsequent transactions to the requested coherency unit as soon as the address agent has finished processing the RTO packet.

Home memory subsystem M detects that no other devices have a shared access right to the coherency unit and that home memory subsystem M is the current owner of the coherency unit. The memory M updates the directory to indicate that the requesting device D1 is the new owner of the requested coherency unit and sends a response RTO to the requesting device D1 (e.g., on the Response Network). Since there are no sharing devices, home memory subsystem M may supply the requested data (DATA) directly to the requesting device D1. In response to receiving the RTO packet on address network 150, device D1 may gain ownership of the requested coherency unit. In response to receiving both the RTO and the DATA packet, device D1 may gain a write access right to the coherency unit. Write access is conditioned upon receipt of the RTO because receipt of the RTO indicates that shared copies of the requested coherency unit have been invalidated.

Figure 13B:
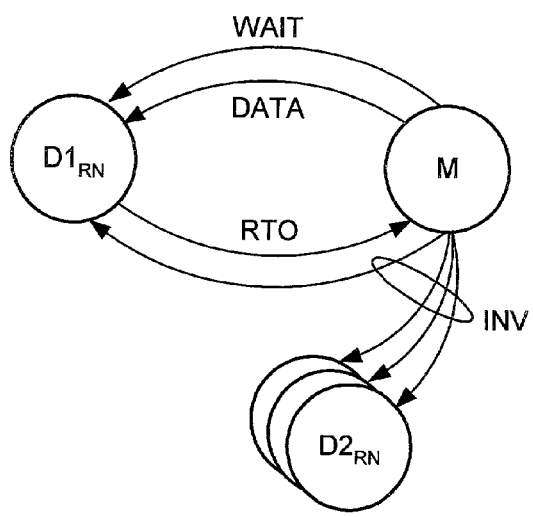

FIG. 13B shows an example of an RTO transaction where there are sharing devices D2 that have a read access right to the requested coherency unit. In this example, an active device D1 has a R access right but not ownership to a coherency unit and initiates an RTO transaction in order to gain a W access right to that coherency unit. The address network 150 conveys the RTO request to the home memory subsystem M. Based on information stored in a directory, home memory subsystem M detects that there are one or more devices D2 with a shared access right to the coherency unit. In order to invalidate the shared copies, home memory subsystem M conveys an invalidating request (INV) to the devices D2 that have a shared access right to the data (e.g., on the Multicast Network). In this example, memory subsystem M is the owner of the requested coherency unit so memory M also forwards a data packet (DATA) corresponding to the requested coherency unit to the requesting device D1.

Receipt of invalidating request INV causes devices D2 to lose the shared access right to the coherency unit (i.e., devices D2 transition their access rights to the I (invalid) access right). With respect to each of devices D2, the invalidating request INV is a "foreign" invalidating request since it is not part of a transaction initiated by that particular device. The home memory subsystem M also conveys the invalidating request INV to requesting device D1 (e.g., on the Multicast Network). Receipt of the INV by the requesting device indicates that shared copies have been invalidated and that write access is now allowed. Thus, upon receipt of the DATA from memory M and the INV, device D1 may gain write access to the coherency unit.

In addition to the sending the invalidating request INV to requesting device D1, home memory subsystem M also sends requesting device D1 a data coherency response WAIT (e.g., on the Response Network). The WAIT response indicates that device D1 should not gain access to the requested coherency unit until D1 has received both the data and an invalidating request INV. D1 may regard the INV as a "local" invalidating request since it is part of the RTO transaction initiated by D1. Thus, the recipient of a local invalidating request (in conjunction with the receipt of a local DATA packet) may gain an access right to the coherency unit while the recipient of a foreign invalidating request loses an access right to the coherency unit. As mentioned briefly above, if the WAIT and INV packets are sent on different virtual networks, it may be possible for device D1 to receive the packets in any order if the virtual networks are unordered with respect to each other. Furthermore, since the DATA packet is conveyed on data network 140, the DATA packet may be received before either of the address packets in some embodiments. Accordingly, if device D1 receives the WAIT response, device D1 may not transition access rights to the coherency unit until both the DATA and the INV have been received. However, if device D1 receives the INV and the DATA before the WAIT, device D1 may gain an access right to the coherency unit, since the INV indicates that any shared copies have been invalidated. When device D1 receives the WAIT response, it may gain ownership responsibilities for the requested coherency unit, regardless of whether the DATA and INV have already been received.

Returning to FIG. 13A, if the requesting device D1 receives the DATA before the RTO response from home memory subsystem M, D1 may not gain an access right to the data until it also receives the RTO response (since D1 may otherwise be unaware of whether there are any shared copies that should be invalidated before D1 gains an access right to the requested data). Once D1 receives the RTO, it may transition its access rights to the coherency unit since receipt of the RTO (as opposed to a WAIT) response indicates that there is no need to wait for an INV. Note that in alternative embodiments, the home memory subsystem M may always send the requesting device an INV (or similar indication that shared copies, if any, have been invalidated) in response to a request (e.g., RTO or WS) that requires shared copies to be invalidated, even if there are no shared copies, so that a separate WAIT packet is unnecessary. In one such embodiment, the address network (as opposed to the home memory subsystem) may return the coherency reply (e.g., the RTO response) that causes an ownership transition to the requesting device.

As mentioned above, in some embodiments, computer system 140 may be configured to send some requests in both BC and PTP modes, and requesting devices such as D1 may be unaware of the mode in which a particular request is transmitted. In such embodiments, however, requesting devices may be configured to transition ownership responsibilities and access rights correctly regardless of the mode in which the request is transmitted. For example, in BC mode, the requester may receive its own RTO on the Broadcast Network (as opposed to on the Response Network from the home memory subsystem). In response to the RTO, the device may transition ownership responsibilities and be aware that it can transition access rights in response to receiving the DATA (since the RTO indicates that there is no need to wait for an INV to invalidate any shared copies). Thus, the data coherency transactions described above may be used in systems that support both BC and PTP modes where requesting devices are not necessarily aware of which mode their request is transmitted in.

Figure 13C:
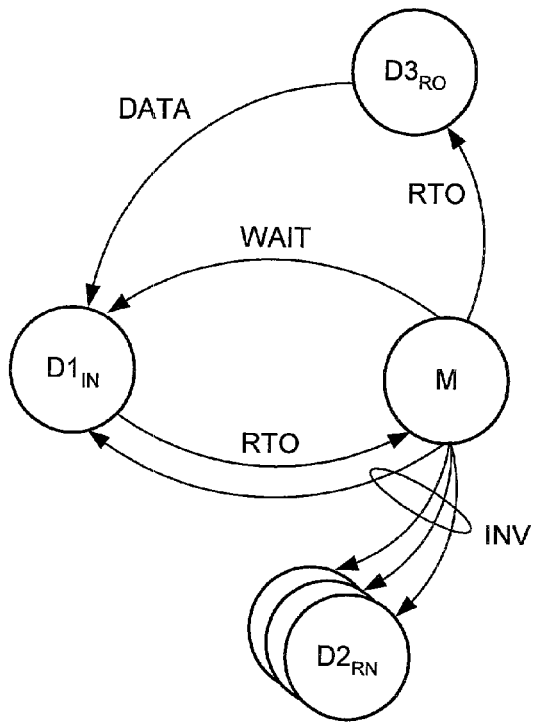

FIG. 13C is a diagram depicting coherency activity in response to a read-to-own request when a device D3 has read access to and is the current owner of the requested coherency unit (as indicated by the subscript "O") and other devices D2 have shared copies of the coherency unit. As in FIGS. 13A and 13B, a requesting device D1 initiates an RTO transaction by sending a read-to-own request on the address network 150. Since the RTO request is in PTP mode, the address network (e.g., the Request Network) conveys the RTO request to the home memory subsystem M. Home memory subsystem M marks the requesting device D1 as the new owner of the coherency unit and sends an RTO response (e.g., on the Response Network) to the prior owner, device D3, of the requested coherency unit. In response to the RTO response (which D3 may regard a "foreign" response since it is not part of a transaction initiated by device D3), device D3 supplies a copy of the coherency unit to device D1. Device D3 loses its ownership responsibilities for the coherency unit in response to receiving the RTO response and loses its access rights to the coherency unit in response to sending the DATA packet to D1. Note that D3 may receive other packets before sending the DATA packet to D1.

Since there are shared copies of the requested coherency unit, the home memory subsystem M sends an invalidating request INV to the sharing devices D2 and requesting device D1 (e.g., on the Multicast Network). Devices D2 invalidate shared copies of the coherency unit upon receipt of INV. Home memory subsystem M also sends a WAIT response (e.g., on the Response Network) to the requesting device D1. In response to receiving the WAIT response, D1 gains ownership of the requested coherency unit. In response to receiving the DATA containing the coherency unit from device D3 and the INV, device D1 gains write access to the coherency unit.

Figure 13D:
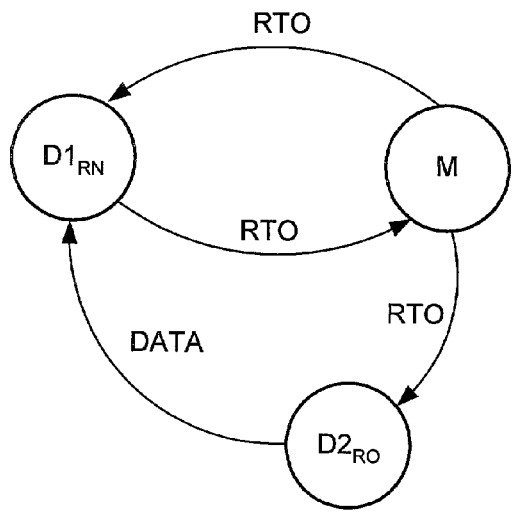

FIG. 13D shows another exemplary RTO transaction. In this example, a requesting device D1 has read access to a coherency unit. Another device D2 has ownership of and read access to the coherency unit. In order to gain write access, D1 initiates an RTO transaction for the coherency unit by sending an RTO request on the address network. The address network conveys the RTO request to the home memory subsystem for the coherency unit. The memory subsystem M sends an RTO response to the owning device D2. When there are non-owning active devices that have shared access to a requested coherency unit, the memory subsystem normally sends INV packets to the sharing devices. However, in this example, the only non-owning sharer D1 is also the requester. Since there is no need to invalidate D1's access right, the memory subsystem may not send an INV packet to D1, thus reducing traffic on the address network. Accordingly, the memory subsystem M may return an RTO response (as opposed to a WAIT) to the requesting device D1. Upon receipt of the RTO response, D1 gains ownership of the requested coherency unit. Likewise, D2 loses ownership upon receipt of the RTO response. D1 gains write access to the requested coherency unit upon receipt of both the RTO response and the DATA packet from D2.

FIG. 13E illustrates a read-to-share (RTS) transaction. In this example, a requesting device D1 has neither an access right to nor ownership of a particular coherency unit. One or more devices D2 have shared access to the coherency unit, and a device D3 has ownership of and read access to the coherency unit. Requesting device D1 initiates the RTS transaction by sending an RTS request upon the address network. Since the request is in PTP mode, the address network (e.g., the Request Network) conveys the RTS request to the home memory subsystem M for the requested coherency unit. In response to the RTS request, home memory subsystem M sends a RTS response (e.g., on the Response Network) on the address network to the owning device D3, which causes device D3 to provide the requesting device D1 with a copy of the requested coherency unit (DATA). Note that if home memory subsystem M had been the owning device, it would have sent the requested coherency unit to the requesting device. Upon receipt of the requested coherency unit, device D1 gains a shared access right to the coherency unit. The RTS transaction has no effect on the devices D2 that have a shared access right to the coherency unit. Additionally, since device D1's ownership rights do not transition during a RTS transaction, device D1 does not receive a response on the address network (and thus in embodiments supporting both BC and PTP modes, receiving a local RTS when in BC mode may have no effect on the initiating device). In a situation where there are no sharing devices D2 and a device D3 has write access to the coherency unit, D3's sending a copy of the requested coherency unit to device D1 causes device D3 to transition its write access right to a read access right.

FIG. 13F shows an exemplary write stream (WS) transaction. In this example, device D2 has invalid access and no ownership of a particular coherency unit. D1 has ownership of and write access to the coherency unit. D2 initiates a WS transaction by sending a WS request on the address network. The address network conveys the request (e.g., on the Request Network) to the home memory subsystem M. The home memory subsystem M forwards the WS request (e.g., on the Response Network) to the owning device D1 and marks itself as the owner of the coherency unit. In response to receiving the WS request, the owning device D1 loses its ownership of the coherency unit and sends an ACK packet representing the coherency unit on the data network to the initiating device D2. It is noted that D1 can receive additional address and/or data packets before sending the ACK packet to device D2. D1 loses its write access to the coherency unit upon sending the ACK packet.

The home memory subsystem M also sends a WS response (e.g., on the Response Network) to the requesting device. Note that the memory M may instead send an INV packet (e.g., on the Multicast Network) if any devices have a shared access right to the coherency unit involved in the WS transaction. In response to receiving the ACK and the WS (or the INV), the requesting device D2 gains an A (All Write) access right to the coherency unit. The home memory system also sends a PRN packet on the data network to the initiating device D2. In response to the PRN packet, the initiating device sends a data packet (DATA) containing the coherency unit to the memory M. The initiating device loses the A access right when it sends the data packet to memory M.

FIG. 13G illustrates a write-back (WB) transaction. In this example, the initiating device D1 initially has ownership of and write access to a coherency unit. The device D1 initiates the WB transaction by sending a WB request on the address network (e.g., on the Request Network). The address network conveys the request to the home memory subsystem M. In response to the WB request, memory M marks itself as the owner of the coherency unit and sends a WB response (e.g., on the Response Network) to the initiating device D1. Upon receipt of the WB response, initiating device D1 loses ownership of the coherency unit. Memory M also sends a PRN packet (e.g., upon the data network) to device D1. In response to the PRN, device D1 sends the coherency unit (DATA) to memory M on the data network. Device D1 loses its access right to the coherency unit when it sends the DATA packet.

The above scenarios are intended to be exemplary only. Numerous alternatives for implementing a directory-based coherency protocol are possible and are contemplated. For example, in the scenario of FIG. 13A, the data packet from memory M may serve to indicate no other valid copies remain within other devices D2. In alternative embodiments, where ordering within the network is not sufficiently strong, various forms of acknowledgements (ACK) and other replies may be utilized to provide confirmation that other copies have been invalidated. For example, each device D2 receiving an invalidate packet (e.g., on the Multicast Network) may respond to the memory M with an ACK. Upon receiving all expected ACKs, memory M may then convey an indication to initiating device D1 indicating that no other valid copies remain within devices D2. Alternatively, initiating device D1 may receive a reply count from memory M or a device D2 indicating a number of replies to expect. Devices D2 may then convey ACKs directly to initiating device D1. Upon receiving the expected number of replies, initiating device D1 may determine all other copies have been invalidated.

While the above examples assume that initiating devices are unaware of whether transaction are implemented in BC or PTP mode, initiating devices may control or be aware of whether transactions are implemented in PTP or BC mode in other embodiments. For example, each initiating device may indicate which virtual network (e.g., Broadcast or Request) or mode a request should be sent in using a virtual network or mode ID encoded in the prefix of the request packet. In other embodiments, a device may be aware of which mode a packet is transmitted in based on virtual network or mode ID encoded (e.g., by the address network) in a packet prefix and may be configured to process packets differently depending on the mode. In such embodiments, a given packet may have a different effect when received as part of a BC mode transaction than when received as part of a PTP mode transaction.

As with the BC mode transactions described above, it is contemplated that numerous variations of computer systems may be designed that employ the principle rules for changing access rights in active devices as described above while in PTP mode. For example, other specific transaction types may be supported, as desired, depending upon the implementation.

It is also noted that variations with respect to the specific packet transfers described above for a given transaction type may also be implemented. Additionally, while ownership transitions are performed in response to receipt of address packets in the embodiments described above, ownership transitions may be performed differently during certain coherence transactions in other embodiments.

In addition, in accordance with the description above, an owning device may not send a corresponding data packet immediately in response to receiving a packet (such as an RTO or RTS) corresponding to a transaction initiated by another device. Instead, the owning device may send and/or receive additional packets before sending the corresponding data packet. In one embodiment, a maximum time period (e.g., maximum number of clock cycles, etc.) may be used to limit the overall length of time an active device may expend before sending a responsive data packet.

Synchronized Networks Property

The Synchronized Networks Property identified above may be achieved using various mechanisms. For example, the Synchronized Networks Property may be achieved by creating a globally synchronous system running on a single clock, and tuning the paths in address network 150 to guarantee that all address packets received by multiple devices (e.g., all multicast and broadcast address packets) arrive at all recipient devices upon the same cycle. In such a system, address packets may be received without buffering them in queues. However, in some embodiments it may instead be desirable to allow for higher communication speeds using source-synchronous signaling in which a source's clock is sent along with a particular packet. In such implementations, the cycle at which the packet will be received may not be known in advance. In addition, it may further be desirable to provide queues for incoming address packets to allow devices to temporarily buffer packets without flow controlling the address network 150.

In some embodiments, the Synchronized Networks Property may be satisfied by implementing a Synchronized Multicasts Property. The Synchronized Multicasts Property is based on the following definitions:

1) Logical Reception Time: Each client device receives exactly 0 or 1 multicast or broadcast packets at each logical reception time. Logical reception time progresses sequentially (0,1,2,3, . . . ,n). Any multicast or broadcast is received at the same logical reception time by each client device that receives the multicast or broadcast.

2) Reception Skew: Reception skew is the difference, in real time, from when a first client device C1 is at logical reception time X to when a second client device C2 is at logical reception time X (e.g., the difference, in real time, from when C1 receives a particular multicast or broadcast packet to when C2 receives the same multicast or broadcast packet). Note that the reception skew is a signed quantity. Accordingly, the reception skew from C1 to C2 for a given logical reception time X may be negative if C1 reaches logical reception time X after C2 reaches logical reception time X.

The Synchronized Multicasts Property states that if a point-to-point message M1 is sent from a device C1 to a device C2, and if C1 sends M1 after logical reception time X at C1, then M1 is received by C2 after logical reception time X at C2.

Figure 14:
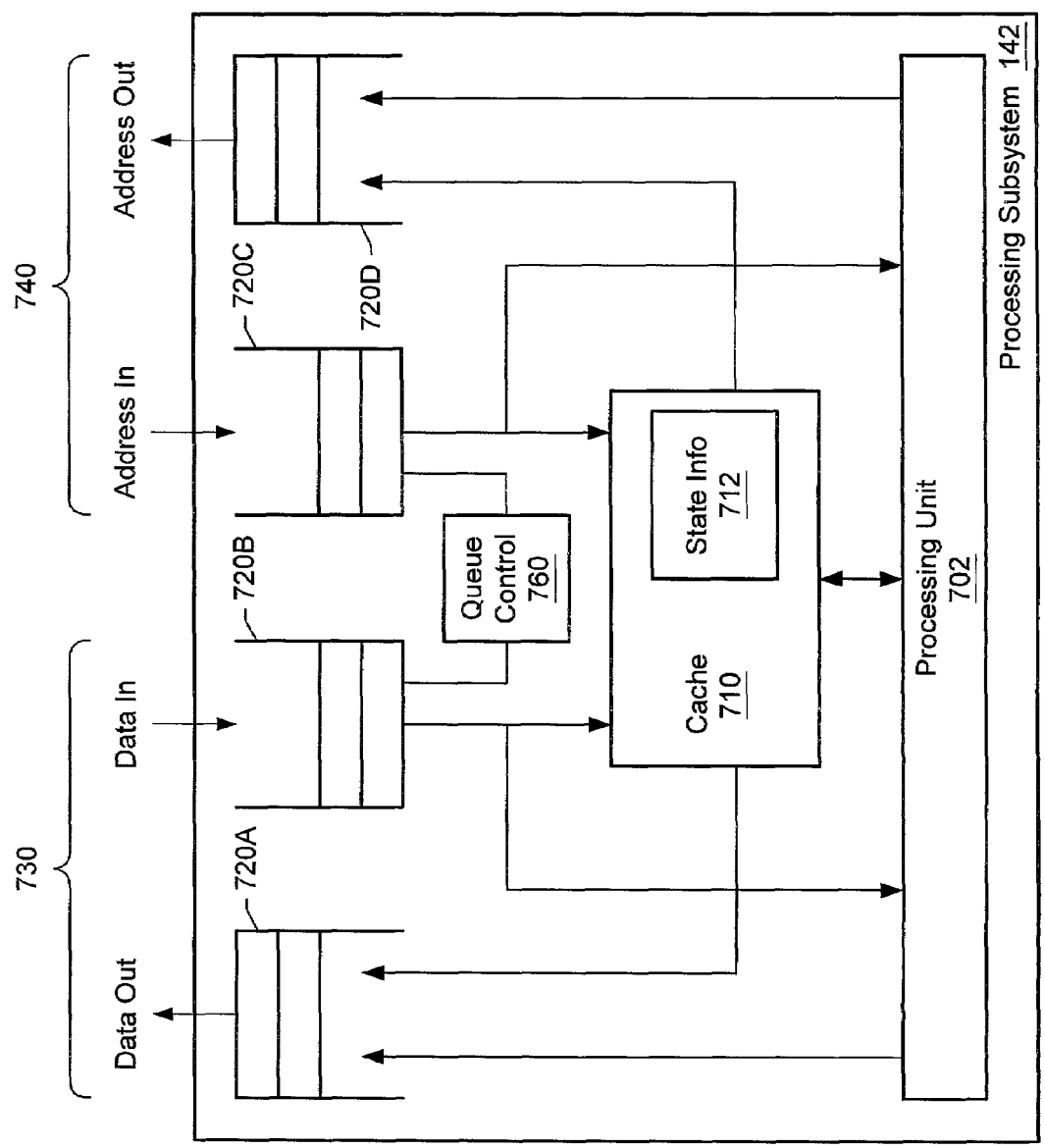
FIG. 14 is a block diagram illustrating details of one embodiment of each of the processing subsystems of FIG. 1.

Details regarding one implementation of computer system 140 which maintains the Synchronized Multicasts Property (and thus the Synchronized Networks Property) without requiring a globally synchronous system and which allows address packets to be buffered is described in conjunction with FIG. 14. FIG. 14 is a block diagram illustrating details of one embodiment of each of the processing subsystems 142 of computer system 140. Included in the embodiment of FIG. 14 are a processing unit 702, cache 710, and queues 720A–720D. Queues 720A–720B are coupled to data network 152 via data links 730, and queues 720C–720D are coupled to address network 150 via address links 740. Each of queues 720 includes a plurality of entries each configured to store an address or data packet. In this embodiment, a packet is "sent" by a subsystem when it is placed into the subsystem's address-out queue 720D or data-out queue 720A. Similarly, a packet may be "received" by a subsystem when it is popped from the subsystem's data-in 720B or address-in queue 720C. Processing unit 702 is shown coupled to cache 710. Cache 710 may be implemented using a hierarchical cache structure.

Processing unit 702 is configured to execute instructions and perform operations on data stored in memory subsystems 144. Cache 710 may be configured to store copies of instructions and/or data retrieved from memory subsystems 144. In addition to storing copies of data and/or instructions, cache 710 also includes state information 712 indicating the coherency state of a particular coherency unit within cache 710, as discussed above. In accordance with the foregoing, if processing unit 702 attempts to read or write to a particular coherency unit and cache state info 712 indicates processing unit 702 does not have adequate access rights to perform the desired operation, an address packet that includes a coherence request may be inserted in address out queue 720D for conveyance on address network 150. Subsequently, data corresponding to the coherency unit may be received via data-in queue 720B.

Processing subsystem 142 may receive coherency demands via address-in queue 720C, such as those received as part of a read-to-own or read-to-share transaction initiated by another active device (or initiated by itself). For example, if processing subsystem 142 receives a packet corresponding to a read-to-own transaction initiated by a foreign device for a coherency unit, the corresponding coherency unit may be returned via data-out queue 720A (e.g., if the coherency unit was owned by the processing subsystem 142) and/or the state information 712 for that coherency unit may be changed to invalid, as discussed above. Other packets corresponding to various coherence transactions and/or non-cacheable transactions may similarly be received through address-in queue 720C. Memory subsystems 144 and I/O subsystem 146 may be implemented using similar queuing mechanisms.

The Synchronized Multicasts Property may be maintained by implementing address network 150 and data network 152 in accordance with certain network conveyance properties and by controlling queues 720 according to certain queue control properties. In particular, in one implementation address network 150 and data network 152 are implemented such that the maximum arrival skew from when any multicast or broadcast packet (conveyed on address network 150) arrives at any first client device to when the same multicast or broadcast packet arrives at any second, different client device is less than the minimum latency for any message sent point-to-point (e.g., on the Response or Request virtual networks or on the data network 152) from the first client device to the second client device. Such an implementation results in a Network Conveyance Property (which is stated in terms of packet arrivals (i.e., when packets arrive at in queues 720B and 720C) rather than receptions (i.e., when a packet affects ownership status and/or access rights in the receiving device)). The Network Conveyance Property is based on the following definitions:

1) Logical Arrival Time: Exactly 0 or 1 multicast or broadcast packets arrive at each client device at each logical arrival time. Logical arrival time progresses sequentially (0,1,2,3, . . . ,n). Any multicast or broadcast is received at the same logical arrival time by each client device that receives the multicast or broadcast.
2) Arrival Skew: Arrival skew is the difference, in real time, from when a first client device C1 is at logical arrival time X to when a second client device C2 is at logical arrival time X (e.g., the difference, in real time, from when a particular multicast or broadcast packet arrives at C1 to when the same multicast or broadcast packet arrives at C2). Note that the arrival skew is a signed quantity. Accordingly, the arrival skew from C1 to C2 for a given logical arrival time X may be negative if C1 reaches logical arrival time X after C2 reaches logical arrival time X.

The Network Conveyance Property states that if a point-to-point packet M1 is sent from a client device C1 to a client device C2, and if logical arrival time X occurs at C1 before C1 sends M1, then logical arrival time X occurs at C2 before M1 arrives at C2.

In addition to implementing address network 150 and data network 152 such that the Network Conveyance Property holds, address-in queue 720C and data-in queue 720B are controlled by a queue control circuit 760 so that no data packet is removed from the data-in queue 720B for processing until all address packets that arrived earlier than the data packet have been removed from the address-in queue 720C.

In one embodiment, queue control circuit 760 may be configured to control address-in queue 720C and data-in queue 720B such that packets from the address and data networks are placed in the respective queue upon arrival and are removed (and thus received) in the order they are placed in the queues (i.e., on a first-in, first-out basis per queue). Queue control unit 760 may be configured to store a pointer along with an address packet when it is stored in an entry at the head of the address-in queue 720C. The pointer indicates the next available entry in the data-in queue 720B (i.e., the entry that the data-in queue 720C will use to store the next data packet to arrive). In such an embodiment, address packets are received (i.e., they affect the access rights of corresponding coherency units in cache 710) after being popped from the head of address-in queue 720C. Queue control circuit 760 may be configured to prevent a particular data packet from being received (i.e., processed by cache 710 in such a way that access rights are affected) until the pointer corresponding to the address packet at the head of the address-in queue 720C points to an entry of data-in queue 720B that is subsequent to the entry including the particular data packet. In this manner, no data packet is removed from the data-in queue 720B for processing until all address packets that arrived earlier than the data packet have been removed from the address-in queue 720C.

In an alternative embodiment, queue control circuit 760 may be configured to place a token in the address-in queue 720C whenever a packet is placed in the data-in queue 720B. In such an embodiment, queue control 760 may prevent a packet from being removed from the data-in queue 720B until its matching token has been removed from the address-in queue 720C. It is noted that various other specific implementations of queue control circuit 760 to control the processing of packets associated with queues 720 are contemplated.

By controlling address-in queue 720C and data-in queue 720B in this manner and by implementing address network 150 and data network 152 in accordance with the Network Conveyance Property discussed above, computer system 140 may maintain the Synchronized Multicasts Property.

In alternative embodiments, the Synchronized Multicasts Property may be satisfied using timestamps. For example, timestamps may be conveyed with data and/or address packets. Each device may inhibit receipt of a particular packet based on that packet's timestamp such that the Synchronized Multicasts Property holds.

Figure 15:
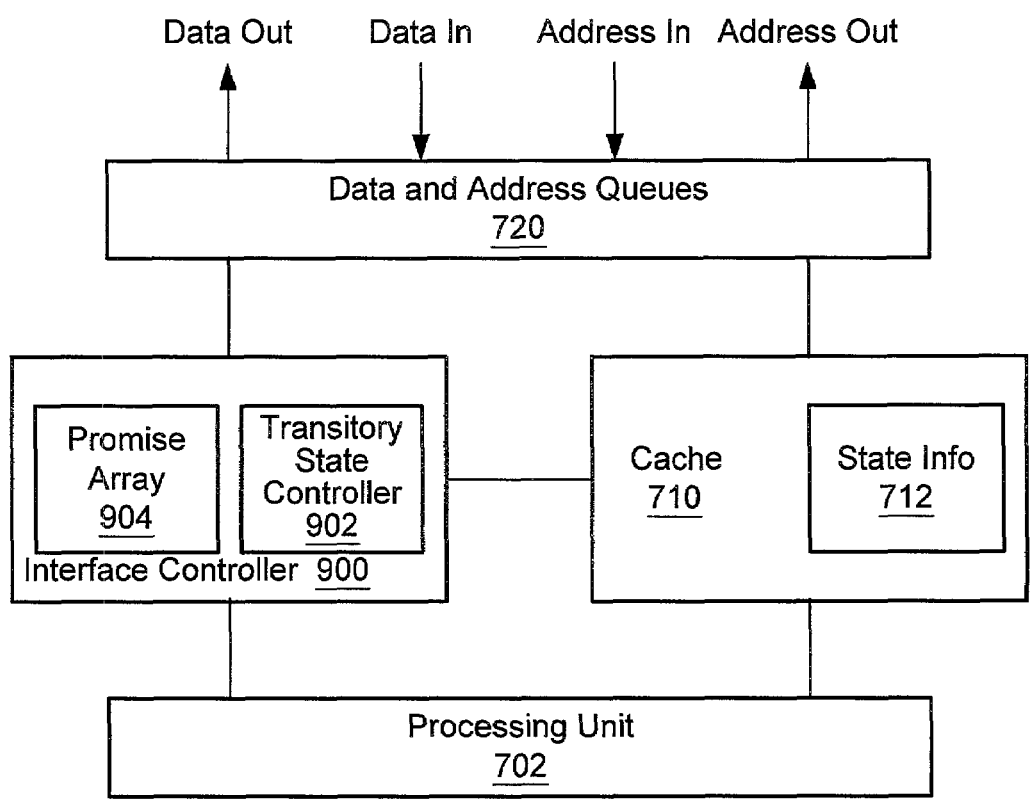
FIG. 15 is a block diagram illustrating further details regarding one embodiment of each of the processing subsystems of FIG. 1.

Turning next to FIG. 15, further details regarding an embodiment of each of the processing subsystems 142 of FIG. 1 are shown. Circuit portions that correspond to those of FIG. 14 are numbered identically.

FIG. 15 depicts an interface controller 900 coupled to processing unit 702, cache 710, and data and address queues 720. Interface controller 900 is provided to control functionality associated with the interfacing of processing subsystem 142 to other client devices through address network 150 and data network 152. More particularly, interface controller 900 is configured to process various requests initiated by processing unit 702 that require external communications (e.g., packet transmissions) to other client devices, such as load and store requests that initiate read-to-share and read-to-own transactions. Interface controller 900 is also configured to process communications corresponding to transactions initiated by other client devices. In one particular implementation, interface controller 900 includes functionality to process transactions in accordance with the foregoing description, including that associated with the processing of the coherence operations as illustrated in FIGS. 12A–12F and FIGS. 13A–13G. For this purpose, functionality depicted as transitory state controller 902 is provided within interface controller 900 for processing outstanding local transactions (that is, transactions initiated by processing subsystem 142 that have not reached a stable completed state). To support this operation, information relating to the processing of coherence operations (including state information) may be passed between interface controller 902 and cache 710. Transitory state controller 902 may include multiple independent state machines (not shown), each of which may be configured to process a single outstanding local transaction until completion.

The functionality depicted by transitory state controller 902 may be configured to maintain various transitory states associated with outstanding transactions, depending upon the implementation and the types of transactions that may be supported by the system. For example, from the exemplary transaction illustrated in FIG. 12B, device D2 enters a transitory state IO (Invalid, Owned) after receiving its own RTO and prior to receiving a corresponding data packet from device D1. Similarly, device D1 enters transitory state WN (Write, Not Owned) in response to receiving the RTO from device D2. D1's transitory state is maintained until the corresponding data packet is sent to device D2. In one embodiment, transitory state controller 902 maintains such transitory states for pending local transactions to thereby control the processing of address and data packets according to the coherence protocol until such local transactions have completed to a stable state.

Referring back to FIG. 10C, it is noted that states WO, RO, RN, and IN are equivalent to corresponding states defined by the well-known MOSI coherence protocol. These four states, in addition to state WN, are stable states. The other states depicted in FIG. 10C are transient and only exist during the processing of a local transaction by interface controller 900. Local transactions are transactions that were initiated by the local active device. In addition, in one embodiment, the state WN may not be maintained for coherency units that do not have a local transaction pending since it may be possible to immediately downgrade from state WN to state RN for such coherency units. As a result, in one particular implementation, only two bits of state information are maintained for each coherency unit within state information storage 712 of cache 710. Encodings for the two bits are provided that correspond to states WO, RO, RN, and IN. In such an embodiment, transitory state information corresponding to pending local transactions may be separately maintained by transitory state controller 902.

Figure 16:
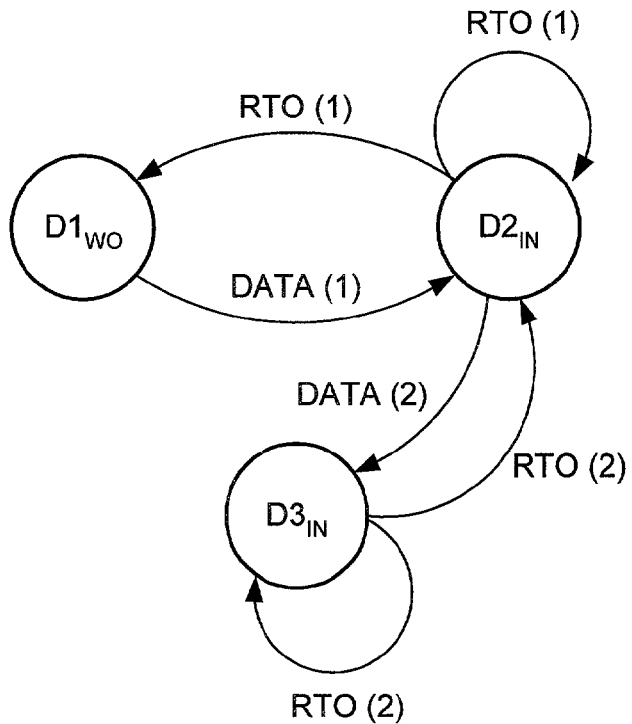
FIG. 16 is a diagram illustrating multiple coherence transactions initiated for the same coherency unit in one embodiment of a computer system.

Various additional transitory states may also result when a coherence transaction is initiated by an active device while a coherence transaction to the same coherency unit is pending within another active device. For example, FIG. 16 illustrates a situation in which an active device D1 has a W access right and ownership for a particular coherency unit, and an active device D2 initiates an RTO transaction in order to obtain a W access right to the coherency unit. When D1 receives the RTO packet through address network 150 (e.g., on the Broadcast Network in BC mode or on the Response Network in PTP mode), D1 changes its ownership status to N (Not Owned). D2 changes its ownership status to O (Owned) when it receives its own RTO through address network 150 (e.g., on the Broadcast Network in BC mode or on the Response Network in PTP mode). Another active device D3 may subsequently issue another RTO to the same coherency unit that is received by D2 through address network 150 before a corresponding data packet is received at D2 from D1. In this situation, D2 may change its ownership status to N (Not Owned) when the second RTO is received. In addition, when D3 receives its own RTO through address network 150, its ownership status changes to O (Owned). When a corresponding data packet is received by D2 from D1, D2's access right changes to a write access right. D2 may exercise this write access right repeatedly, as desired. At some later time, a corresponding data packet may be sent from D2 to D3. When the data is received by D3, it acquires a W access right. Such operations and transitory state transitions may be performed and maintained by the functionality depicted by transitory state controller 902, as needed, based upon the types of transactions that may be supported and the particular sequence of packet transmissions and receptions that may occur, as well as upon the particular coherence methodology that may be chosen for a given implementation.

FIGS. 15A–15D show various specific cache states that may be implemented in one embodiment of an active device. Note that other embodiments may be implemented differently than the one shown in FIGS. 15A–15D. FIG. 15A shows various cache states and their descriptions. Each cache state is identified by two capital letters (e.g., WO) identifying the current access right (e.g., "W"=write access) and ownership responsibility (e.g., "O"=ownership). Transitory states are further identified by one or more lowercase letters. In transitory states, an active device may be waiting for receipt of one or more address and/or data packets in order to complete a local transaction (i.e., a transaction initiated by that device). Note that transitory states may also occur during foreign transactions (i.e., transactions initiated by other devices) in some embodiments.

Figure 15C:
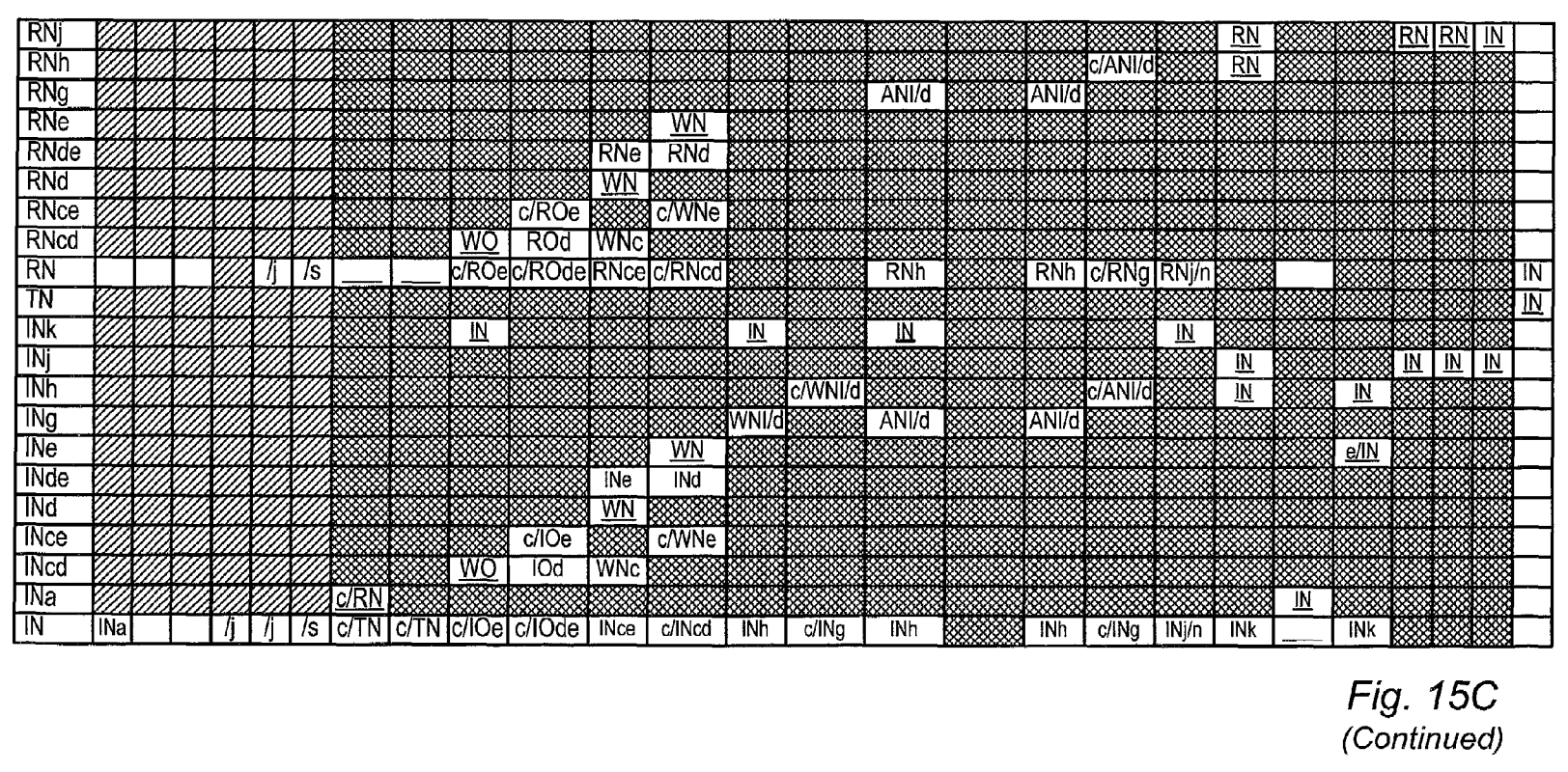

FIGS. 15B–15D also illustrate how the various cache states implemented in one embodiment may change in response to events such as sending and receiving packets and describe events that may take place in these cache states.

Note that, with respect to FIGS. 15A–15D, when a particular packet is described as being sent or received, the description refers to the logical sending or receiving of such a packet, regardless of whether that packet is combined with another logical packet. For example, a DATA packet is considered to be sent or received if a DATA or DATAP packet is sent or received. Similarly, an ACK packet is considered to be sent or received if an ACK or PRACK packet is sent or received, and a PRN packet is considered to be sent or received if a PRN, DATAP, or PRACK packet is sent or received.

State transitions and actions that may take place in response to various events that occur during local transactions are illustrated in FIGS. 15C. FIG. 15D similarly illustrates state transitions and actions that may take place in response to various events that occur during foreign transactions. In the illustrated embodiment, certain events are not allowed in certain states. These events are referred to as illegal events and are shown as darkened entries in the tables of FIGS. 15C–15D. In response to certain states occurring for a particular cache line, an active device may perform one or more actions involving that cache line. Actions are abbreviated in FIGS. 15C–15D as one or more alphabetic action codes. FIG. 15B explains the actions represented by each of the action codes shown in FIGS. 15C–15D. In FIGS. 15C–15D, each value entry may include an action code (e or c) followed by a "/", a next state (if any), an additional "/", and one or more other action codes (a, d, i, j, n, r, s, w, y, or z) (note that one or more of the foregoing entry items may be omitted in any given entry).

As illustrated, the interface controller 900 depicted in FIG. 15 may further include a promise array 904. As described above, in response to a coherence request, a processing subsystem that owns a coherency unit may be required to forward data for the coherency unit to another device. However, the processing subsystem that owns the coherency unit may not have the corresponding data when the coherence request is received. Promise array 904 is configured to store information identifying data packets that must be conveyed to other devices on data network 152 in response to pending coherence transactions as dictated by the coherence protocol.

Promise array 904 may be implemented using various storage structures. For example, promise array 904 may be implemented using a fully sized array that is large enough to store information corresponding to all outstanding transactions for which data packets must be conveyed. In one particular implementation, each active device in the system can have at most one outstanding transaction per coherency unit. In this manner, the maximum number of data packets that may need to be forwarded to other devices may be bound, and the overall size of the promise array may be chosen to allow for the maximum number of data promises. In alternative configurations, address transactions may be flow-controlled in the event promise array 904 becomes full and is unable to store additional information corresponding to additional data promises. Promise array 904 may include a plurality of entries, each configured to store information that identifies a particular data packet that needs to be forwarded, as well as information identifying the destination to which the data packet must be forwarded. In one particular implementation, promise array 904 may be implemented using a linked list.

Figure 17:
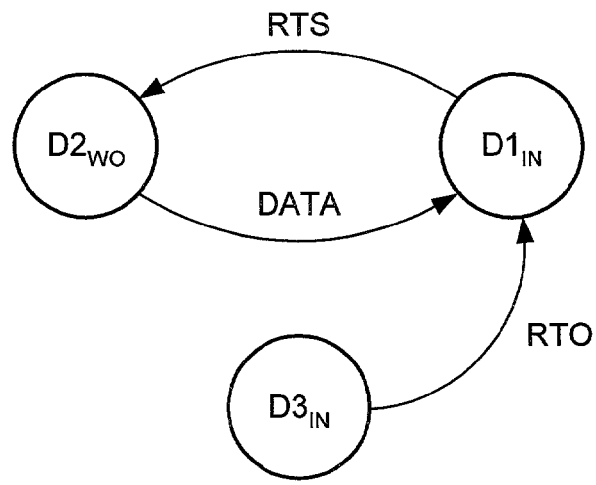
FIG. 17 is a diagram illustrating communications between active devices in accordance with one embodiment of a computer system.

Turning next to FIG. 17, it is noted that systems that employ general aspects of the coherence protocols described above could potentially experience a starvation problem. More particularly, as illustrated, an active device D1 may request a read-only copy of a coherency unit to perform a load operation by conveying a read-to-share (RTS) packet upon address network 150. However, as stated previously, a corresponding data packet may not be conveyed to D1 from D2 (i.e., the owning device) until some time later. Prior to receiving the corresponding data packet, device D1 has the coherency unit in an I (Invalid) state. Prior to receiving the corresponding data packet, a device D3 may initiate an RTO (or other invalidating transaction) that is received by D1 ahead of the corresponding data packet. This situation may prevent device D1 from gaining the read access right to the coherency unit since the previously received RTO may nullify the effect of the first request. Although device D1 may issue another RTS to again attempt to satisfy the load, additional read-to-own operations may again be initiated by other active devices that continue to prevent device D1 from gaining the necessary access right. Potentially, requests for shared access to a coherency unit could be nullified an unbounded number of times by requests for exclusive access to the coherency unit, thus causing starvation.

Such a starvation situation can be avoided by defining certain loads as critical loads. Generally speaking, a critical load refers to a load operation initiated by an active device that can be logically reordered in the global order without violating program order. In one embodiment that implements a TSO (Total Store Order) memory model, a load operation is a critical load if it is the oldest uncommitted load operation initiated by processing unit 702. To avoid starvation, in response to an indication that an outstanding RTS corresponds to a critical load and receipt of a packet that is part of an intervening foreign RTO transaction to the same coherency unit (before a corresponding data packet for the RTS is received) transitory state controller 902 may be configured to provide a T (Transient-Read) access right to the coherency unit upon receipt of the data packet. The T access right allows the load to be satisfied when the data packet is received. After the load is satisfied, the state of the coherency unit is downgraded to I (Invalid). This mechanism allows critical loads to be logically reordered in the global order without violating program order. The load can be viewed as having logically occurred at some point right after the owner (device D2) sends a first packet to D1 (or to device D3) but before the device performing the RTO (device D3) receives its corresponding data packet. In this manner, the value provided to satisfy the load in device D1 includes the values of all writes prior to this time and none of the values of writes following this time.

In one particular implementation, processing unit 702 may provide an indication that a load is the oldest uncommitted load when the load request is conveyed to interface controller 900. In another embodiment, a load may be indicated as being a critical load if it is the oldest uncommitted load at the time the local RTS is conveyed on address network 150. In still a further embodiment, a load may be indicated as being a critical load if it is the oldest uncommitted load at the time the foreign invalidating RTO is received.

It is noted that, in the scenario described in conjunction with FIG. 17, if the RTS is not indicated as being associated with a critical load, transitory state controller 902 may maintain the coherency unit in the I (Invalid) state (rather than assigning the T state) in response to receiving the corresponding data.

It is also noted that in systems that implement other memory models, a load operation may be a critical load (i.e., a load operation that can be logically reordered in the global order) when other conditions exist. For example, in a system that implements sequential consistency, a load operation may be defined as a critical load if there are no older uncommitted load or store operations.

Figure 18:
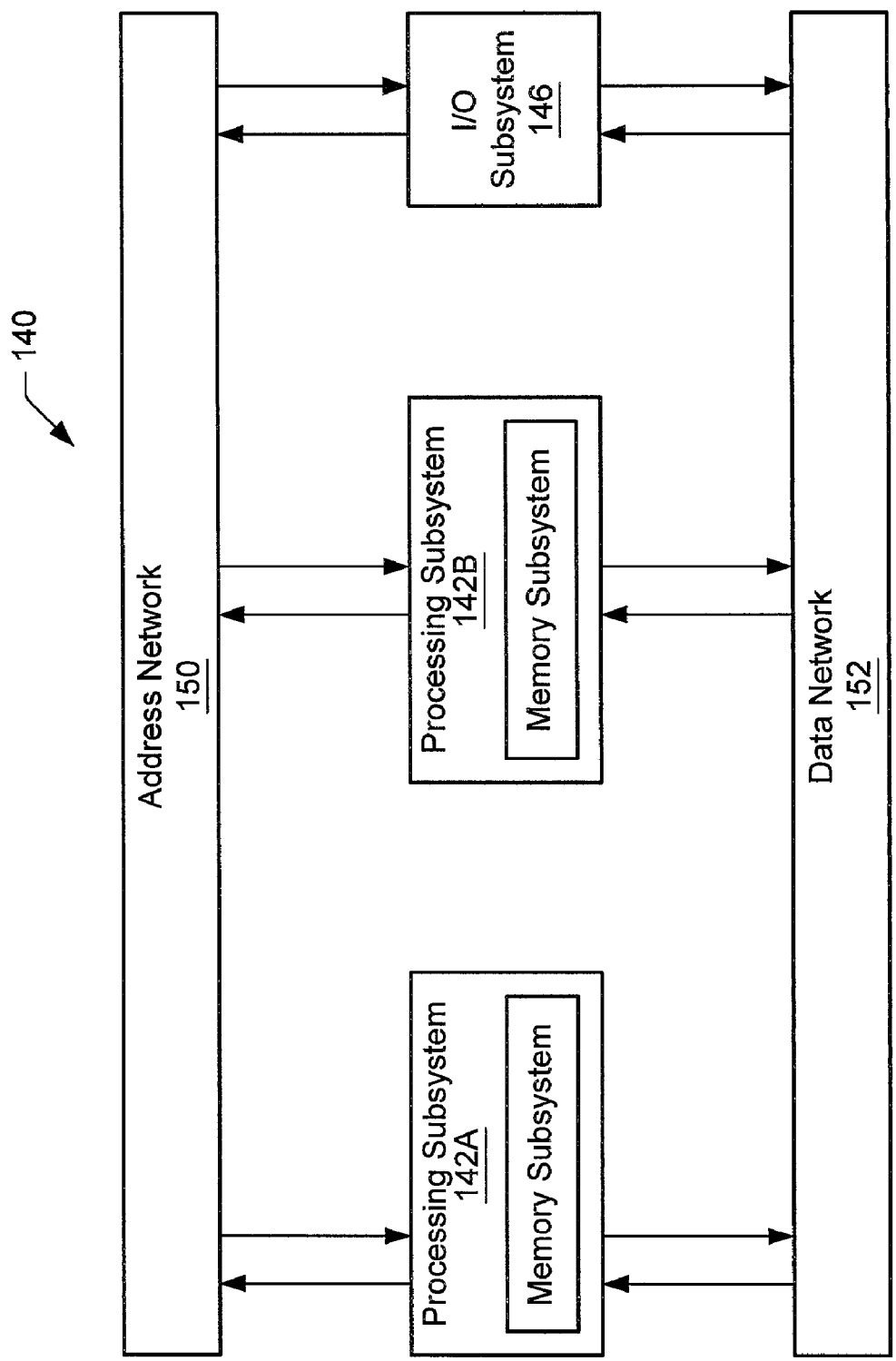
FIG. 18 is a block diagram of another embodiment of a multiprocessing computer system.

In addition, it is noted that in other embodiments memory subsystems 144 may be integrated with the functionality of processing subsystems 142, as depicted in FIG. 18. In such embodiments, the conveyance of certain packets on the address and/or data networks as discussed above for particular coherence transactions may not be necessary.

Multi-level Address Switches

Figure 19:
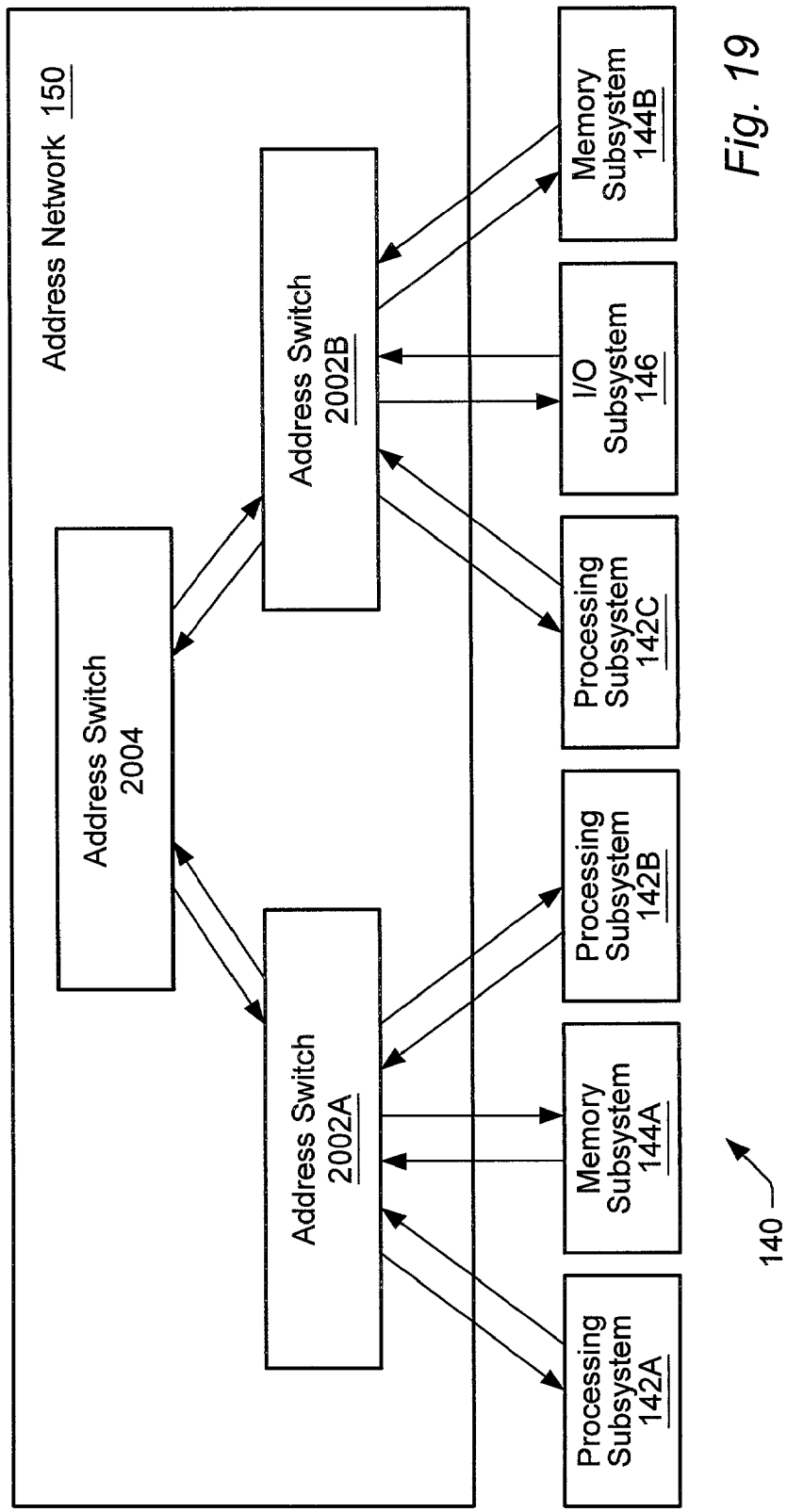
FIG. 19 shows a block diagram of one embodiment of an address network.

In some embodiments of computer system 140, multiple levels of address switches may be used to implement address network 150, as shown in FIG. 19. In this embodiment, there are two levels of address switches. First level address switch 2004 communicates packets between the second level address switches 2002A and 2002B. In the illustrated embodiment, the second level address switches (collectively referred to as address switches 2002) communicate packets directly with a unique set of client devices. However, in other embodiments, the sets of client devices that each second level address switch communicates with may not be unique. In some embodiments, a rootless address network (i.e., an address network in which there is not a common address switch through which all multicast and broadcast address packets are routed) may be implemented.

In one embodiment, the address network 150 may be configured to convey an address packet from processing subsystem 142A to memory subsystem 144B in PTP mode. The address packet may first be conveyed from processing system 142A to address switch 2002A. Address switch 2002A may determine that the destination of the address packet is not one of the client devices that it communicates with and communicate the packet to first stage address switch 2004. The first level address switch 2004 routes the packet to address switch 2002B, which then conveys the packet to memory subsystem 144.

Address network 150 may also be configured to convey address packets in BC mode in some embodiments. An address packet being conveyed in BC mode from processing subsystem 142A may be received by address switch 2002A and conveyed to address switch 2004. In one embodiment, address switch 2002A may access a mode table to determine whether to transmit the packet in BC or PTP mode and encode a mode (or virtual network) indication in the packet's prefix to indicate which mode it should be transmitted in. Address switch 2004 may then broadcast the packet to both second level address switches 2002. Thus, address switches at the same level receive the multicast or broadcast packet at the same time. In turn, address switches 2002 broadcast the packet to all of the devices with which they communicate. In embodiments supporting different virtual networks, invalidating packets sent on the Multicast Network may be similarly broadcast to all of the higher-level address switches (e.g., broadcast by first- level address switch 2004 to second- level address switches 2002). The highest-level address switches (second- level address switches 2002 in the illustrated embodiment) may then multicast the multicast packet to the appropriate destination devices. In order to satisfy the various ordering properties, all of the highest- level switches may arbitrate between address packets in the same manner. For example, in one embodiment, address switches may prioritize broadcasts and/or multicasts ahead of other address packets. In some embodiments, address switches may prioritize broadcasts and multicasts ahead of other address packets during certain arbitration cycles and allow only non-broadcast and non-multicast address packets to progress during the remaining arbitration cycles in order to avoid deadlock. Note that other embodiments may implement multiple levels of address switches in a different manner.

PTP Mode Coherence Transactions in Embodiments that Lack Virtual Networks

As mentioned above, some embodiments of computer system 140 may not implement address network 150 as different virtual networks. Thus, in one such embodiment of computer system 140, PTP mode transactions may be implemented without subdividing transactions into various virtual networks (e.g., without classifying packets as Response, Request, or Multicast packets as described above). The following examples illustrate transactions that may be performed in systems that do not implement multiple virtual address networks.

Figure 20A:
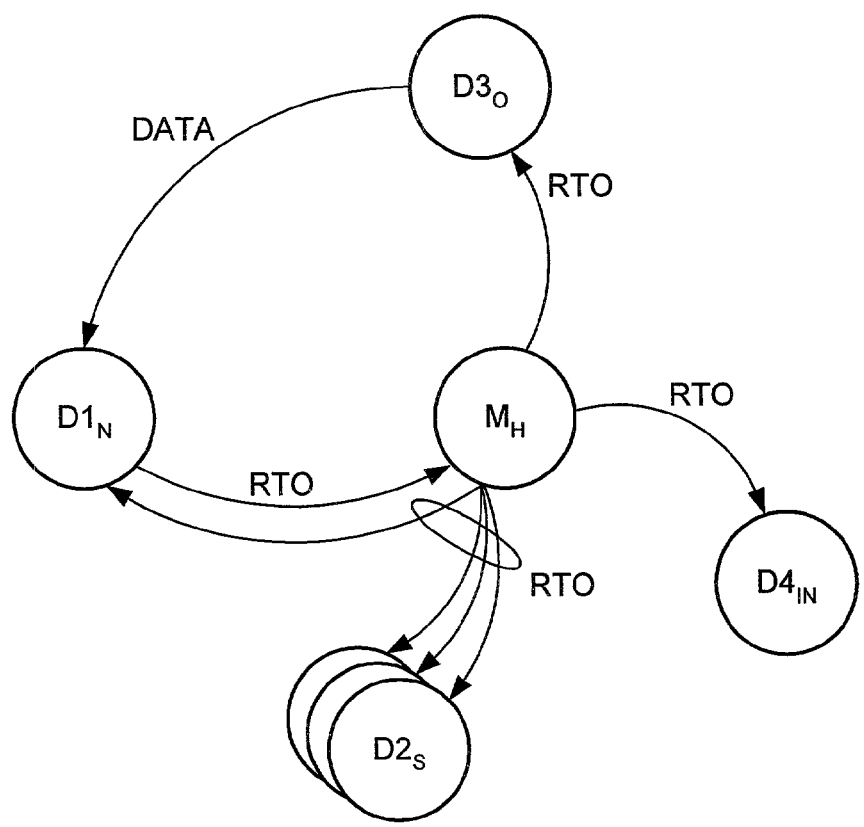
FIGS. 20A–20B show examples of read-to-own (RTO) transactions in one embodiment of a computer system.
Figure 20B:
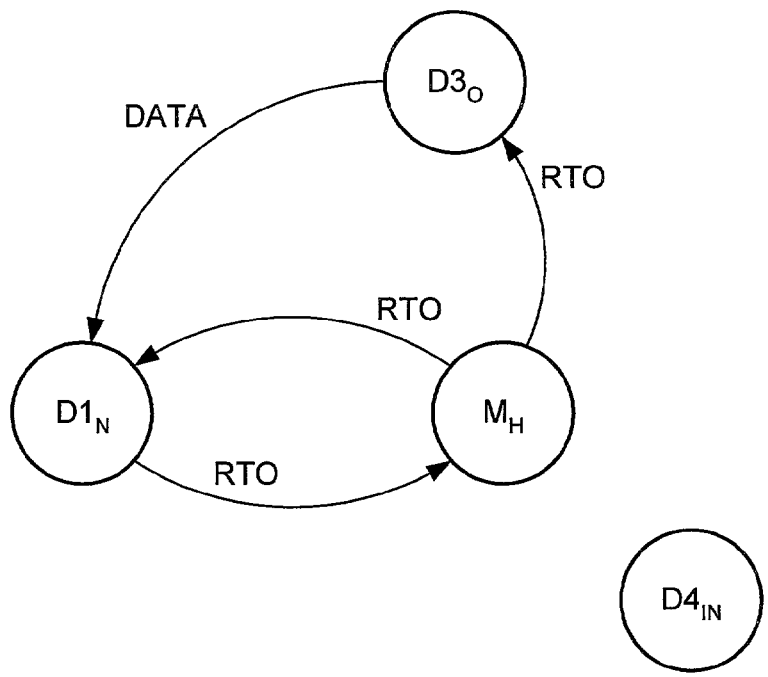

FIGS. 20A–20B show examples of how some embodiments of a computer system 140 may implement PTP mode RTO transactions without implementing multiple virtual address networks. In such embodiments, the address network 150 conveys address packets that initiate a transaction to the home subsystem that maps the coherency unit involved in the transaction. Using a directory maintained by the home memory subsystem, the home memory subsystem sends an address packet that causes ownership and/or access transitions to one or more of the client devices. In one embodiment, the directory information for each coherency unit may indicate whether that coherency unit is owned by an active device other than the home subsystem (without necessarily identifying the owning device) and whether any active devices have a shared access right to that coherency unit (without necessarily identifying the sharing devices or the set(s) of devices that include the sharing devices).

In FIG. 20A, device D1 is not an owner of a coherency unit. Device D1 initiates a RTO transaction by sending a RTO request for that coherency unit on the address network 150. The address network 150 conveys the RTO to the memory subsystem M that maps the requested coherency unit. In this example, the directory indicates that the memory subsystem is not the owner of the coherency unit (e.g., by specifying the owning device D3 or by simply indicating that an active device is the owner) and that there are client devices with a shared access right. Based on the directory information, the memory subsystem M may broadcast the RTO (or another address packet, such as an INV packet, designed to effect the necessary access and/or ownership transitions for the requested coherency unit) to all of the active devices in the computer system. In response to receipt of the foreign RTO, the owning device D3 loses ownership of the requested coherency unit and sends a data packet corresponding to the requested coherency unit to the requesting device D1. In response to receiving its own RTO, the requesting device D1 gains ownership of the requested coherency unit. The requesting device D1 gains access to the requested coherency unit when it receives the data packet (note that access rights for device D1 may also be conditioned upon receipt of the RTO). Receipt of the foreign RTO causes sharing devices D2 to lose their access right to the coherency unit.

In FIG. 20B, a device D1 initiates an RTO transaction by sending an RTO request on the address network. The address network conveys the request to the home memory subsystem M. In this example, the directory indicates that a device D3 is the owner of the requested coherency unit and that there are no sharers. Accordingly, memory subsystem M sends the RTO to the owning device D3 and the requesting device D1. Since there are no sharers and the owner is known, the RTO sent from the memory subsystem may not be broadcast and thus non-owning, non-sharing device D4 may not receive the RTO. Owning device D3 loses ownership of the requested coherency unit upon receipt of the RTO and loses access to the coherency unit upon sending a data packet DATA containing the requested coherency unit to the requesting device D1. Requesting device D1 gains ownership upon receipt of the RTO from the memory subsystem M and write access upon receipt of the RTO or INV and the DATA packet from device D3.

In other embodiments, when there are sharers, the home memory subsystem may multicast the address packet to a subset of the active devices that includes the owner (if any), the requester, and the sharers. In embodiments such as these, it may be desirable to keep address packets in different transactions ordered with respect to each other. Thus, the address network may be configured to send each RTO sent by the memory system M (regardless of whether it is a multicast or broadcast or a response) to the lowest level address switch (e.g., switch 2004 in FIG. 19), and that switch may then broadcast the address packet to the next-higher level switches 2002. The address switches at the same level may arbitrate between all of the RTO's sent by the memory system in the same way so that each active device receives the address packet in the same order in which the memory subsystem M sent them. This may increase the traffic on the address network 150 since all of the address packets sent by the memory subsystem are broadcast through the address network, regardless of whether they are actually being broadcast or multicast to the active devices. Thus, some embodiments that implement different virtual networks (e.g., as described in FIGS. 13A–13G above) may provide reduced address network traffic compared to embodiments that do not implement different virtual networks since the virtual networks may allow some packets (e.g., such as those sent in the Request Network) to not be broadcast throughout the address network 150.

Numerous variations and modifications will become apparent to those skilled in the art once the above disclosure is fully appreciated. It is intended that the following claims be interpreted to embrace all such variations and modifications.

What is claimed is:

1. A computer system comprising:
   a plurality of active devices including a first active device that includes a first cache;
   a directory configured to indicate which of the plurality of active devices has an ownership responsibility for a given coherency unit;
   an address network configured to convey address packets between the plurality of active devices and the directory;
   a data network configured to convey data packets between the plurality of active devices;
   wherein depending upon whether the directory indicates that at least one active device included in a first subset of the plurality of active devices has a shared access right to a first coherency unit, the directory is configured to send an invalidating address packet on the address network to each active device included in the first subset;
   wherein the first active device is configured to transition an ownership responsibility for a first coherency unit cached in the first cache upon receipt of a first address packet and to transition an access right to the first coherency unit cached in the first cache upon receipt of a corresponding data packet, wherein the ownership responsibility transitions at a different time than the access right transitions.

2. The computer system of claim 1, wherein the directory is configured to send the first invalidating packet to the first active device and the first active device is configured to transition an access right to the first coherency unit in the first cache upon receiving a data packet corresponding to the first coherency unit on the data network and the invalidating address packet on the address network.

3. The computer system of claim 1, wherein the plurality of active devices is divided into subsets, wherein the directory is configured to track which subsets of the plurality of active devices contain an active device that has a shared access right to a given coherency unit.

4. The computer system of claim 1, wherein the first subset contains a single active device.

5. The computer system as recited in claim 1, wherein the first address packet is sent from the directory to the first active device.

6. The computer system as recited in claim 1, wherein the plurality of active devices includes a second active device, wherein the data packet corresponding to the first coherency unit received by the first active device is conveyed through the data network from the second active device.

7. The computer system as recited in claim 6, wherein an access right associated with the first coherency unit cached in a second cache included in the second active device transitions in response to the second active device sending the data corresponding to the first coherency unit to the first active device.

8. The computer system as recited in claim 7, wherein an ownership responsibility corresponding to the first coherency unit in the second cache transitions upon the second active device receiving a third address packet on the address network.

9. The computer system as recited in claim 6, wherein the first address packet is a read-to-own packet.

10. The computer system as recited in claim 6, wherein the plurality of active devices includes a third active device that includes a third cache, wherein an access right associated with the first coherency unit cached in the third cache transitions to an invalid access right upon the third active device receiving the invalidating address packet.

11. The computer system as recited in claim 10, wherein the directory is configured to send the invalidating address packet to each of the active devices that has a shared access right to and does not own the first coherency unit.

12. The computer system as recited in claim 1, wherein the first subset contains fewer than all of the active devices.

13. The computer system as recited in claim 1, wherein dependent upon whether the directory indicates that at least one of the active devices has a shared access right to the first coherency unit, the first address packet indicates that the access right to the first coherency unit in the first cache should not transition until the first active device receives both a second address packet and the corresponding data packet.

14. A computer system comprising:
   a plurality of active devices, wherein each active device includes a cache configured to store data accessed by that active device;
   a directory configured to indicate which of the active devices has an ownership responsibility for a given coherency unit;

an address network configured to convey address packets between the plurality of active devices and the directory;

a data network configured to convey data packets between the plurality of active devices;

wherein depending upon whether the directory indicates that at least one active device included in a first subset of the active devices has a shared access right to a first coherency unit, the directory is configured to send an invalidating address packet on the address network to the first subset of the active devices;

wherein a first active device of the plurality of active devices is configured to transition its access right to the first coherency unit in response to sending a data packet corresponding to the first coherency unit on the data network.

15. A method for maintaining coherency in a computer system comprising a plurality of active devices that each include a cache, the method comprising:

a first active device of the plurality of active devices sending a first address packet on an address network in order to gain an access right to a first coherency unit, wherein the first active device includes a first cache;

conveying the first address packet point-to-point through the address network to a directory;

depending upon whether the directory indicates that at least one of a first subset of the plurality of active devices has a shared access right to the first coherency unit, the directory sending an invalidating packet to the first subset of the plurality of the active devices; and the first active device transitioning an ownership responsibility for the first coherency unit cached in the first cache upon receiving a second address packet and transitioning an access right to the first coherency unit cached in the first cache upon receiving a corresponding data packet;

wherein said transitioning the ownership responsibility occurs at a different time than said transitioning the access right.

16. The method as recited in claim 15, further comprising the directory indicating that a device has an ownership responsibility for the first coherency unit.

17. The method as recited in claim 16, wherein the device is a second active device.

18. The method as recited in claim 17, further comprising changing an access right to the first coherency unit cached in the second active device in response to transmitting the data packet.

19. The method as recited in claim 17, further comprising changing an ownership responsibility for the first coherency unit cached in the second active device upon the second active device receiving a third address packet through the address network.

20. The method as recited in claim 15, further comprising changing an access right corresponding to the first coherency unit cached in a third active device upon the third active device receiving the invalidating address packet through the address network.

21. A computer system comprising:

a plurality of means for accessing data including a first means for accessing data, wherein the first means for accessing data includes a first cache;

means for storing ownership information associated with one or more coherency units and for storing access information indicating that at least one of the plurality of means for accessing data included in a subset of the means for accessing data has a shared access right to a first coherency unit;

means for conveying coherence requests point-to-point between the plurality of means for accessing data and the means for storing ownership information;

means for conveying data between the plurality of means for accessing data;

wherein the means for storing ownership information conveys an invalidating coherence request to each of the means for accessing data included in the first subset of the means for accessing data dependent upon the access information for the first coherency unit;

wherein the first means transitions an ownership responsibility for the first coherency unit cached in the first cache upon receiving a first coherence request on the means for conveying coherence requests;

wherein the first means transitions an access right to the first coherency unit cached in the first cache upon receiving corresponding data on the means for conveying data;

wherein the access right transitions at a different time than the ownership responsibility transitions.

* * * * *